United States Patent
Lee et al.

(10) Patent No.: US 11,372,563 B2
(45) Date of Patent: Jun. 28, 2022

(54) STORAGE DEVICE AND OPERATING METHOD THEREOF

(71) Applicant: SK hynix Inc., Gyeonggi-do (KR)

(72) Inventors: Hyun Woo Lee, Gyeonggi-do (KR); Young Gyun Kim, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 38 days.

(21) Appl. No.: 16/549,437

(22) Filed: Aug. 23, 2019

(65) Prior Publication Data

US 2020/0225859 A1 Jul. 16, 2020

(30) Foreign Application Priority Data

Jan. 11, 2019 (KR) .......................... 10-2019-0004124

(51) Int. Cl.
*G06F 3/06* (2006.01)
*G06F 12/02* (2006.01)

(52) U.S. Cl.
CPC .......... *G06F 3/0632* (2013.01); *G06F 3/0604* (2013.01); *G06F 3/0634* (2013.01); *G06F 3/0659* (2013.01); *G06F 3/0679* (2013.01); *G06F 12/0246* (2013.01); *G06F 2212/7206* (2013.01); *G06F 2212/7207* (2013.01)

(58) Field of Classification Search
None
See application file for complete search history.

(56) References Cited

U.S. PATENT DOCUMENTS

| | | | | |
|---|---|---|---|---|
| 5,973,988 | A * | 10/1999 | Nakahira | G11C 7/1045 365/189.03 |
| 2005/0024980 | A1* | 2/2005 | Roohparvar | G11C 7/1045 365/232 |
| 2008/0235444 | A1* | 9/2008 | Gower | G11C 7/1003 711/105 |
| 2015/0286593 | A1* | 10/2015 | Gans | G11C 7/1045 710/313 |
| 2018/0025760 | A1* | 1/2018 | Mazumder | G11C 29/00 365/189.02 |
| 2019/0103154 | A1* | 4/2019 | Cox | G11C 7/227 |
| 2019/0220227 | A1* | 7/2019 | Kim | G11C 7/1045 |
| 2019/0391758 | A1* | 12/2019 | Fujiu | G06F 3/0679 |
| 2020/0167227 | A1* | 5/2020 | Her | G06F 11/1004 |

FOREIGN PATENT DOCUMENTS

| | | |
|---|---|---|
| KR | 10-1139207 | 4/2012 |
| KR | 10-2013-0053287 | 5/2013 |
| KR | 10-1824067 | 1/2018 |

OTHER PUBLICATIONS

JEDEC. DDR4 SDRAM. Sep. 2012. JESD79-4. pp. 64. (Year: 2012).*
Hybrid Memory Cube Consortium. Hybrid Memory Cube Specification 1.0. 2013. Version 1.0. (Year: 2013).*

* cited by examiner

*Primary Examiner* — Nathan Sadler
(74) *Attorney, Agent, or Firm* — IP & T Group LLP

(57) ABSTRACT

A storage device having an improved operation speed includes a memory controller for controlling a memory device. The memory controller includes a parameter data generator for generating parameter data for changing a parameter value related to an operation of the memory device, and a parameter controller for outputting the parameter data. The parameter data includes an error protection field associated with the parameter value.

20 Claims, 12 Drawing Sheets

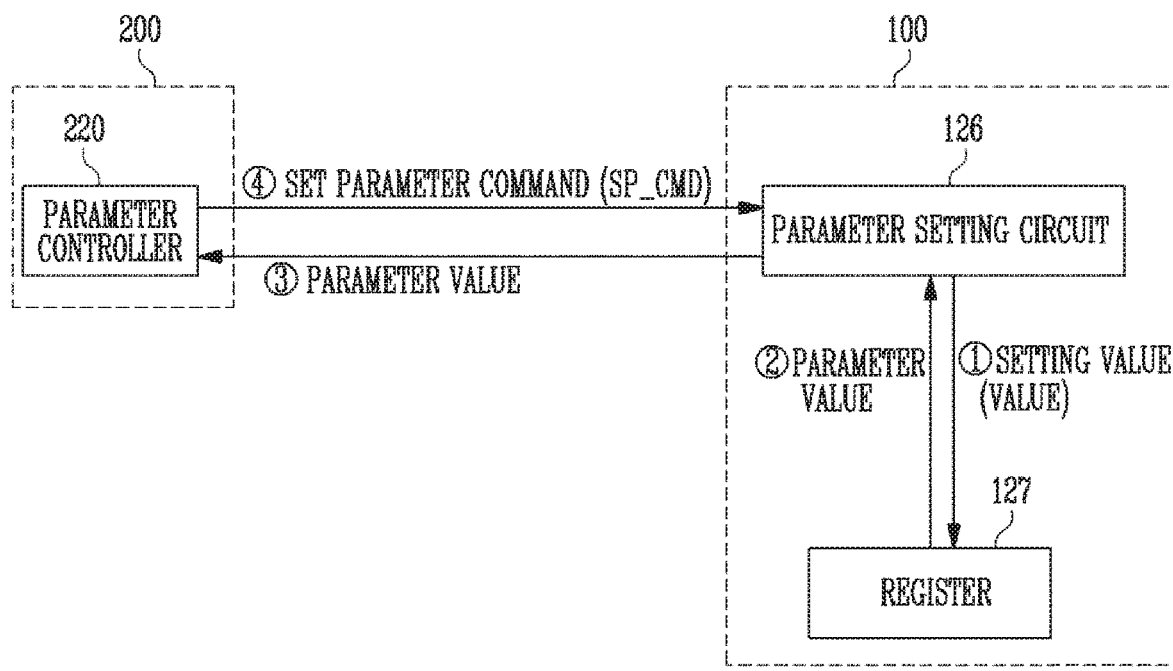

STORAGE DEVICE AND OPERATING METHOD THEREOF

CROSS-REFERENCE TO RELATED APPLICATION

The present application claims priority under 35 U.S.C. § 119(a) to Korean patent application number 10-2019-0004124, filed on Jan. 11, 2019, the entire disclosure of which is incorporated herein by reference in its entirety.

BACKGROUND

Field of Invention

The present disclosure generally relates to an electronic device, and more particularly, to a storage device and an operating method thereof.

Description of Related Art

A storage device typically stores data under the control of a host device such as a computer, a smart phone or a smart pad. The storage device may store data on a magnetic disk, such as a Hard Disk Drive (HDD), and also may store data on a semiconductor memory, i.e., a nonvolatile memory, such as a Solid State Drive (SSD) or a memory card.

The storage device may include a memory device configured to store data and a memory controller configured to control the memory device. The memory device is classified into a volatile memory device and a nonvolatile memory device. The nonvolatile memory device includes a Read Only Memory (ROM), a Programmable ROM (PROM), an Electrically Programmable ROM (EPROM), an Electrically Erasable and Programmable ROM (EEPROM), a flash memory, a Phase-change RAM (PRAM), a Magnetic RAM (MRAM), a Resistive RAM (RRAM), a Ferroelectric RAM (FRAM), and the like.

SUMMARY

Embodiments provide a storage device for setting normal parameters and an operating method thereof.

In accordance with an aspect of the present disclosure, there is provided a memory controller for controlling a memory device, the memory controller including: a parameter data generator configured to generate parameter data for changing a parameter value related to an operation of the memory device and a parameter controller configured to output the parameter data, wherein the parameter data includes an error protection field associated with the parameter value.

In accordance with another aspect of the present disclosure, there is provided a method for operating a memory controller for controlling a memory device, the method including: generating parameter data for storing or changing a parameter value related to an operation of the memory device and outputting the parameter data, wherein the parameter data includes an error protection field associated with the parameter value.

In accordance with still another aspect of the present disclosure, there is provided a memory device for storing data, the memory device including: a parameter setting circuit configured to set a parameter value related to an operation of the memory device and a register configured to store the parameter value, wherein, when parameter data including the parameter value includes an error protection field, the parameter setting circuit performs storing or changing the parameter value, based on a value of the error protection field.

In accordance with an aspect of the present disclosure, there is provided a storage device including: a memory device including a register and a controller configured to generate parameter data including a parameter value and a return field for requesting a return of a value of the register, wherein the memory device receives the parameter data, stores the parameter value in the register to perform an operation based on the parameter value and transmits, to the controller, the value of the register in response to a value of the return field.

BRIEF DESCRIPTION OF THE DRAWINGS

Example embodiments will now be described more fully hereinafter with reference to the accompanying drawings; however, the examples may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 6 is a diagram illustrating operations of a memory device and a memory controller when a setting value return field is included in parameter data in accordance with an embodiment of the present disclosure.

FIG. 7 is a diagram illustrating a parameter change group field in accordance with an embodiment of the present disclosure.

FIG. 8 is a diagram illustrating a change data display field and a method for changing a parameter according to the change data display field in accordance with an embodiment of the present disclosure.

DETAILED DESCRIPTION

Figure 1:
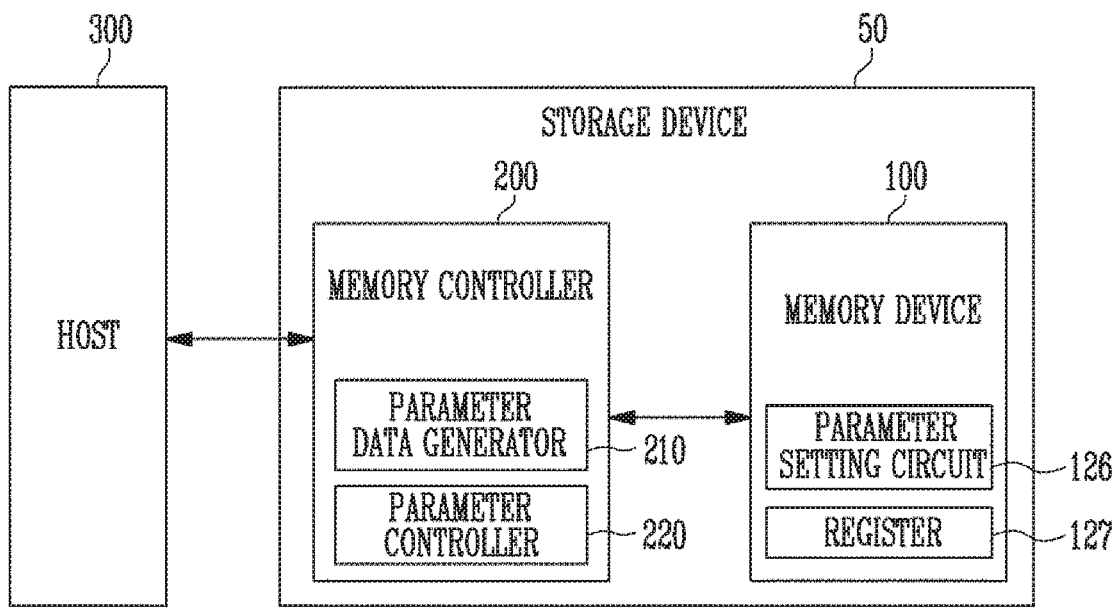
FIG. 1 is a block diagram illustrating a storage device in accordance with an embodiment of the present disclosure.

The specific structural or functional description disclosed herein is merely illustrative for the purpose of describing embodiments according to the concept of the present disclosure. The embodiments according to the concept of the present disclosure can be implemented in various forms, and cannot be construed as limited to the embodiments set forth herein.

The embodiments according to the concept of the present disclosure can be variously modified and have various shapes. The embodiments are illustrated in the drawings and are intended to be described herein in detail. However, the embodiments according to the concept of the present disclosure are not construed as limited to specified disclosures, and include all changes, equivalents, or substitutes that do not depart from the spirit and technical scope of the present disclosure.

While terms such as "first" and "second" may be used to describe various components, such components must not be understood as being limited to the above terms. The above terms are used only to distinguish one component from another. For example, a first component may be referred to as a second component without departing from the scope of the present disclosure, and likewise a second component may be referred to as a first component.

It will be understood that when an element is referred to as being "connected" or "coupled" to another element, it can be directly connected or coupled to the other element or intervening elements may also be present. In contrast, when an element is referred to as being "directly connected" or "directly coupled" to another element, no intervening elements are present. Meanwhile, other expressions describing relationships between components such as "~ between," "immediately ~ between" or "adjacent to ~" and "directly adjacent to ~" may be construed similarly.

The terms used in the present application are merely used to describe particular embodiments, and are not intended to limit the present disclosure. Singular forms in the present disclosure are intended to include the plural forms as well, unless the context clearly indicates otherwise. It will be further understood that terms such as "including" or "having," etc., are intended to indicate the existence of features, numbers, operations, actions, components, parts, or combinations thereof disclosed in the specification, and are not intended to preclude the possibility that one or more other features, numbers, operations, actions, components, parts, or combinations thereof may exist or may be added.

So far as not being differently defined, all terms used herein including technical or scientific terminologies have meanings that are commonly understood by those skilled in the art to which the present disclosure pertains. Terms having definitions as defined in the dictionary should be understood such that the terms have meanings consistent with the context of the related technique. So far as not being clearly defined in this application, terms should not be understood in an ideally or excessively formal way.

In describing the embodiments, descriptions will be omitted for techniques that are well known to the art to which the present disclosure pertains, and are not directly related to the present disclosure. This intends to disclose the gist of the present disclosure more clearly by omitting unnecessary description.

Hereinafter, exemplary embodiments of the present disclosure will be described in detail with reference to the accompanying drawings in order for those skilled in the art to be able to readily implement the technical spirit of the present disclosure.

FIG. 1 is a block diagram illustrating a storage device 50 in accordance with an embodiment of the present disclosure.

Referring to FIG. 1, the storage device 50 may include a memory device 100 and a memory controller 200.

The storage device 50 may be a device for storing data under the control of a host 300, such as a mobile phone, a smart phone, an MP3 player, a laptop computer, a desktop computer, a game console, a television (TV), a tablet personal computer (PC), or an in-vehicle infotainment.

The storage device 50 may be manufactured as any one of various types of storage devices according to a host interface that is a communication scheme with the host 300. For example, the storage device 50 may be implemented with any one of various types of storage devices such as a Solid State Drive (SSD), a Multi-Media Card (MMC) of an embedded Multi-Media Card (eMMC) type, a Reduced-Size Multi-Media Card (RS-MMC) type, and a micro-Multi-Media Card (micro-MMC) type, a Secure Digital (SD) card of a Secure Digital (SD) type, a mini-Secure Digital (mini-SD) type and a micro-Secure Digital (micro-SD) type, an Universal Serial Bus (USB) storage device, a Universal Flash Storage (UFS) device, a storage device of a Personal Computer Memory Card International Association (PCM-CIA) card type, a storage device of a Peripheral Component Interconnection (PCI) card type, a storage device of a PCI-Express (PCI-e or PCIe) card type, a Compact Flash (CF) card, a smart media card, and a memory stick.

The storage device 50 may be manufactured as any one of various kinds of package types. For example, the storage device 50 may be manufactured as any one of various kinds of package types such as a Package-On-Package (POP), a System-In-Package (SIP), a System-On-Chip (SOC), a Multi-Chip Package (MCP), a Chip-On-Board (COB), a Wafer-level Fabricated Package (WFP), and a Wafer-level Stack Package (WSP).

The memory device 100 may store data. The memory device 100 operates under the control of the memory controller 200. The memory device 100 may include a memory cell array including a plurality of memory cells for storing data. The memory cell array may include a plurality of planes. Each plane may include a plurality of memory blocks BLK1 to BLKz. Each memory block may include a plurality of memory cells. One memory block may include a plurality of pages. In an embodiment, the page may be a unit for storing data in the memory device 100 or reading data stored in the memory device 100. The memory block may be a unit for erasing data. In an embodiment, the memory device 100 may be a Double Data Rate Synchronous Dynamic Random Access Memory (DDR SDRAM), a Low Power Double Data Rate 4 (LPDDR4) SDRAM, a Graphics Double Data Rate (GDDR) SRAM, a Low Power DDR (LPDDR), a Rambus Dynamic Random Access Memory (RDRAM), a NAND flash memory, a vertical NAND flash memory, a NOR flash memory, a Resistive Random Access Memory (RRAM), a Phase-Change Random Access Memory (PRAM), a Magnetoresistive Random Access Memory (MRAM), a Ferroelectric Random Access Memory (FRAM), a Spin Transfer Torque Random Access Memory (STT-RAM), or the like. In this specification, a case where the memory device 100 is a NAND flash memory is described.

In an embodiment, the memory device 100 may be implemented in a three-dimensional array structure. The present disclosure may be applied to not only a flash memory device in which a charge storage layer is configured with a Floating Gate (FG) but also a Charge Trap Flash (CTF) in which a charge storage layer is configured with an insulating layer.

In an embodiment, each of the memory cells in the memory device 100 may be configured as a Single Level Cell (SLC) for storing one bit of data. Also, each of the memory cells in the memory device 100 may be configured as a Multi-Level Cell (MLC) for storing two bits of data, a Triple Level Cell (TLC) for storing three bits of data, or a Quad Level Cell (QLC) for storing four bits of data.

The memory device 100 is configured to receive a command and an address from the memory controller 200 and access an area of the memory cell array selected by the address. That is, the memory device 100 may perform an operation corresponding to the command on the area selected by the address. For example, the memory device 100 may perform a write (or program) operation, a read operation, and an erase operation. In the program operation, the memory device 100 may program data in the area selected by the address. In the read operation, the memory device 100 may read data from the area selected by the address. In the erase operation, the memory device 100 may erase data stored in the area selected by the address.

The memory device 100 may perform a program operation or an erase operation with a set operating voltage under the control of the memory controller 200.

In an embodiment, the memory device 100 may include a parameter setting circuit 126. The parameter setting circuit 126 may set a parameter value necessary for an operation performed by the memory device 100. Specifically, the parameter setting circuit 126 may set a parameter value necessary for any one operation among a program operation, a read operation, and an erase operation, which are performed by the memory device 100. The memory device 100 may perform any one operation among the program operation, the read operation and the erase operation, based on the set parameter value.

In an embodiment, when parameter data PM_DATA received from the memory controller 200 includes an error protection field, the parameter setting circuit 126 may perform an operation for storing a setting value VALUE in the parameter data PM_DATA, based on a value of the error protection field. Therefore, the parameter setting circuit 126 may perform the operation for storing the setting value VALUE according to whether a setting value return (VALUE RETURN) field, a parameter change group (PARAMETER CHANGE GROUP) field, or a change data display (MASK) field is included in the error protection field (see FIG. 5).

The memory device 100 may include a register 127. The register 127 may receive a setting value VALUE from the parameter setting circuit 126. The register 127 may store the setting value VALUE (see FIG. 6). The register 127 may output a stored parameter value in response to a request of the parameter setting circuit 126.

The memory controller 200 may control overall operations of the storage device 50.

When power is applied to the storage device 50, the memory controller 200 may execute firmware (FW). When the memory device 100 is a flash memory device, the memory controller 200 may execute FW such as a Flash Translation Layer (FTL) for controlling communication between the host 300 and the memory device 100.

In an embodiment, the memory controller 200 may receive data and a Logical Block Address (LBA) from the host 300, and translate the LBA into a Physical Block Address (PBA) representing addresses of memory cells in the memory device 100, in which data is to be stored. Also, the memory controller 200 may store, in a buffer memory, logical-to-physical address mapping information that establishes a mapping relationship between the LBA and the PBA.

The memory controller 200 may control the memory device 100 to perform a program operation, a read operation, or an erase operation, in response to a request from the host 300. In the program operation, the memory controller 200 may provide a program command, a PBA, and data to the memory device 100. In the read operation, the memory controller 200 may provide a read command and a PBA to the memory device 100. In the erase operation, the memory controller 200 may provide an erase command and a PBA to the memory device 100.

In an embodiment, the memory controller 200 may autonomously generate a program command, an address, and data without any request from the host 300, and transmit the program command, the address, and the data to the memory device 100. For example, the memory controller 200 may provide the command, the address, and the data to the memory device 100 to perform background operations such as a wear leveling operation and a garbage collection operation.

In an embodiment, the memory controller 200 may include a parameter data generator 210. The parameter data generator 210 may generate parameter data PM_DATA. For example, the parameter data generator 210 may generate parameter data PM_DATA for performing an operation corresponding to a request received from the host 300. The memory device 100 may perform the operation corresponding to the request received from the host 300, based on the parameter data PM_DATA. That is, when the parameter data PM_DATA is stored in the memory device 100, the memory device 100 may perform the operation corresponding to the request of the host 300, based on the stored parameter data PM_DATA. The operation performed by the memory device 100 may be any one of a program (or write) operation, a read operation, and an erase operation.

In an embodiment, the parameter data PM_DATA may be data for changing a parameter value related to the operation performed by the memory device 100. The parameter data generator 210 may generate parameter data PM_DATA, based on an internal operation of the memory controller 200.

The internal operation of the memory controller 200 may be performed based on the operation performed by the memory device 100.

The parameter data generator 210 may provide the generated parameter data PM_DATA to a parameter controller 220. The parameter controller 220 may perform an operation for storing a setting value VALUE of the parameter data PM_DATA in the memory device 100.

In an embodiment, the memory controller 200 may include the parameter controller 220. The parameter controller 220 may output a set parameter command SP_CMD, a parameter address PM_ADDR, and parameter data PM_DATA to the memory device 100, based on the parameter data PM_DATA. That is, the parameter controller 220 may perform an operation for allowing the memory device 100 to operate according to the setting value VALUE in the parameter data PM_DATA.

When the parameter data PM_DATA includes an error protection field, the parameter controller 220 may perform an operation based on the error protection field.

Specifically, when the error protection field includes a setting value return (VALUE RETURN) field, the parameter controller 220 may perform an operation for requesting a parameter value stored in the register 127. That is, the parameter controller 220 may output, to the memory device 100, a set parameter command SP_CMD for requesting a parameter value stored in the register 127. When the setting value VALUE in the parameter data PM_DATA does not correspond to the parameter value stored in the register 127, the parameter controller 220 may perform an operation for re-setting the setting value VALUE in the parameter data PM_DATA.

In an embodiment, the storage device 50 may include at least two memory devices 100 and the memory controller 200 may control the memory devices 100. The memory controller 200 may control the memory devices 100 according to an interleaving scheme so as to improve operational performance.

The host 300 may communicate with the storage device 50, using at least one of various communication manners, such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a Non-Volatile Memory express (NVMe), a universal flash storage (UFS), a Secure Digital (SD), a Multi-Media Card (MMC), an embedded MMC (eMMC), a Dual In-line Memory Module (DIMM), a Registered DIMM (RDIMM), and a Load Reduced DIMM (LRDIMM).

Figure 2:
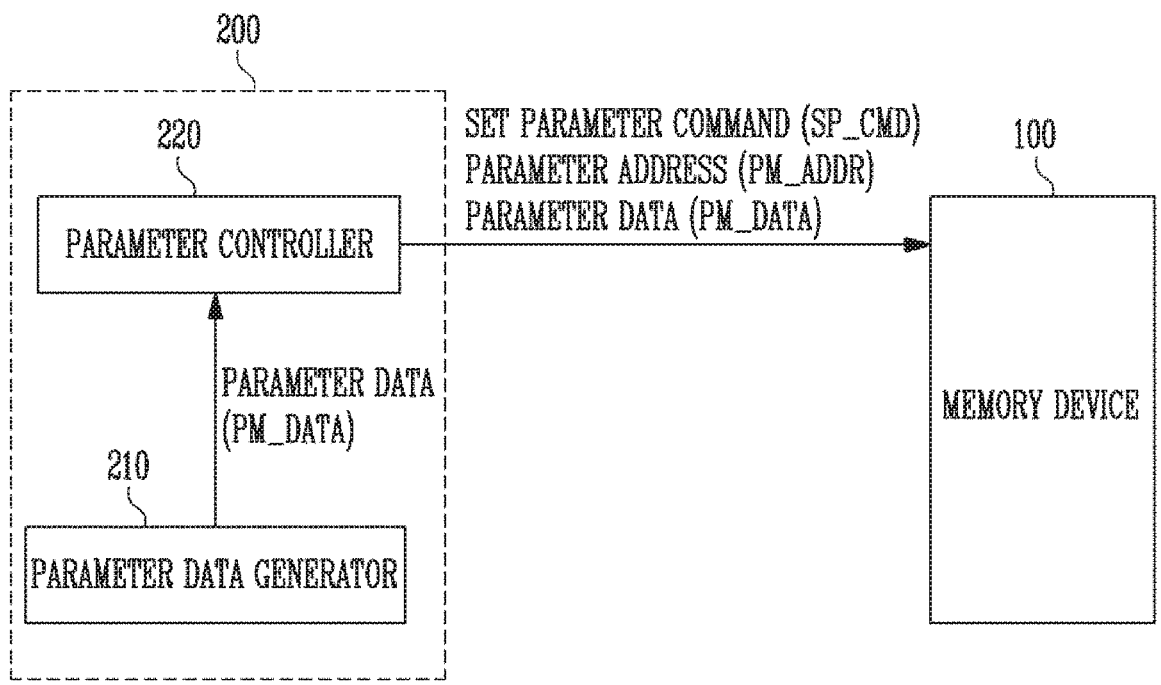
FIG. 2 is a diagram illustrating a configuration and an operation of a memory controller in accordance with an embodiment of the present disclosure.

FIG. 2 is a diagram illustrating a configuration and an operation of a memory controller in accordance with an embodiment of the present disclosure, for example, the memory controller 200 shown in FIG. 1.

Referring to FIG. 2, the memory controller 200 may include a parameter data generator 210 and a parameter controller 220.

The parameter data generator 210 may generate parameter data PM_DATA. The parameter data PM_DATA may be data for changing a parameter value related to an operation performed by the memory device 100. The operation performed by the memory device 100 may be an operation corresponding to a request of the host 300.

In an embodiment, the parameter data generator 210 may receive an improved parameter data generation request, which is internally generated in the memory controller 200. The parameter data generator 210 may receive the improved parameter data generation request, based on a request of the host 300 or an operation performed by the memory device 100.

Specifically, if the parameter data generator 210 receives the improved parameter data generation request when it is determined that a parameter change is necessary, the parameter data generator 210 may generate parameter data PM_DATA including an error protection field. If the parameter data generator 210 does not receive the improved parameter data generation request when it is determined that the parameter change is necessary, the parameter data generator 210 may generate normal parameter data that does not include the error protection field.

The parameter data generator 210 may generate the parameter data PM_DATA including the error protection field. The error protection field may be a field added to the parameter data PM_DATA to prevent a storage or change of an unintended parameter.

In an embodiment, a storage or change of an unintended parameter may occur due to an abnormal change of power such as Sudden Power Off (SPO). That is, in a storage or change of a parameter, the error protection field may be added to the parameter data PM_DATA to store or change a normal parameter. The error protection field may include a setting value return (VALUE RETURN) field, a parameter change group (PARAMETER CHANGE GROUP) field, and a change data display (MASK) field (see FIG. 5). Fields in the error protection field may be diversified in addition to the above-described fields.

In an embodiment, the setting value return (VALUE RETURN) field may represent that, after a setting value VALUE in the parameter data PM_DATA is stored in the register 127, the setting value VALUE in the register 127 is requested.

In an embodiment, the parameter change group (PARAMETER CHANGE GROUP) field may represent that an operation performed by the memory device 100 is sorted as a group, and it is determined whether a setting value VALUE in the parameter data PM_DATA is a parameter value related to the corresponding operation. The memory device 100 may change the parameter value only when the setting value VALUE in the parameter data PM_DATA is the parameter value related to the corresponding operation.

In an embodiment, the change data display (MASK) field may represent a position of data to be changed in a parameter stored in the memory device 100. That is, the memory device 100 may change only the data located at the position represented by the change data display (MASK) field, based on the change data display (MASK) field.

Each field included in the error protection field will be described in more detail with reference to FIGS. 5 to 8.

The parameter controller 220 may provide the memory device 100 with a set parameter command SP_CMD, a parameter address PM_ADDR, and parameter data PM_DATA to store the setting value VALUE of the parameter data PM_DATA in the memory device 100. The memory device 100 may store the setting value VALUE of the parameter data PM_DATA by receiving the set parameter command SP_CMD, the parameter address PM_ADDR, and the parameter data PM_DATA from the parameter controller 220. Subsequently, the memory device 100 may perform an operation, based on the stored parameter value. The operation performed by the memory device 100 may be a program operation, a read operation, or an erase operation. The parameter value of the memory device 100 may include a value related to a program voltage, a read voltage, or an erase voltage.

Figure 3:
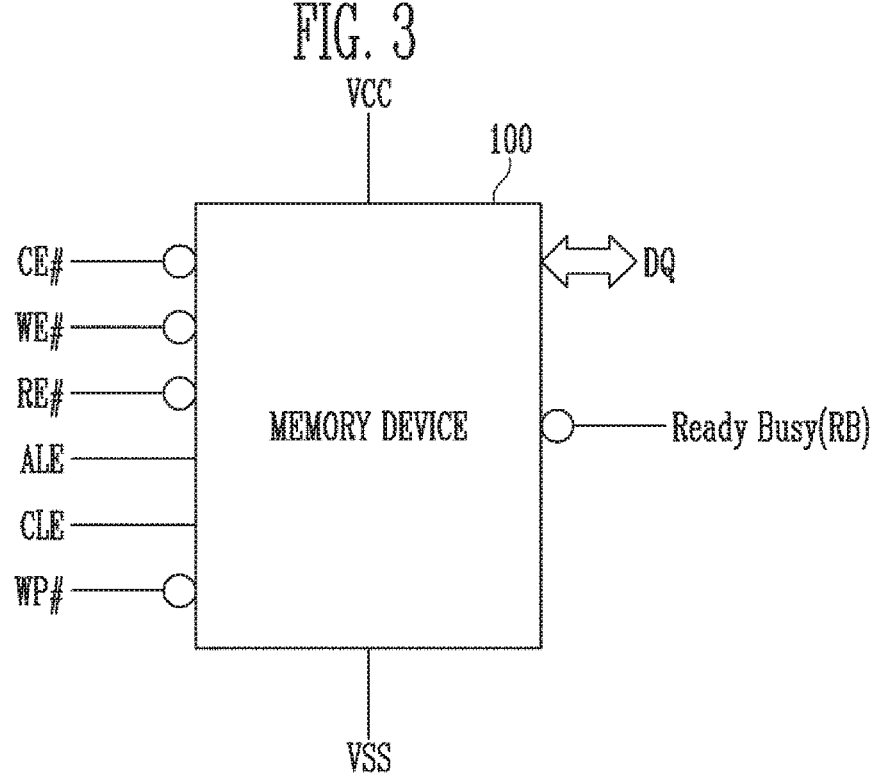
FIG. 3 is a diagram illustrating a pin configuration of a memory device in accordance with an embodiment of the present disclosure.

FIG. 3 is a diagram illustrating a pin configuration of a memory device in accordance with an embodiment of the present disclosure, for example, the memory device 100 shown in FIG. 1.

Referring to FIG. 3, the memory device 100 may communicate with an external controller (e.g., the memory controller 200 of FIGS. 1 and 2) through a plurality of input and output (input/output) lines. For example, the memory device 100 may communicate with the external controller through control signal lines including a chip enable line CE #, a write enable line WE #, a read enable line RE #, an address latch enable line ALE, a command latch enable line CLE, a write prevention line WP #, and a ready busy line RB, and data input/output lines DQ.

The memory device 100 may receive a chip enable signal from the external controller through the chip enable line CE #. The memory device 100 may receive a write enable signal from the external controller through the write enable line WE #. The memory device 100 may receive a read enable signal from the external controller through the read enable line RE #. The memory device 100 may receive an address latch enable signal from the external controller through the address latch enable line ALE. The memory device 100 may receive a command latch enable signal from the external controller through the command latch enable line CLE. The memory device 100 may receive a write prevention signal from the external controller through the write prevention line WP #.

In an embodiment, the memory device 100 may provide the memory controller 200 with a ready busy signal for outputting whether the memory device 100 is in a ready state or busy state, through the ready busy line RB.

The chip enable signal may be a control signal for selecting the memory device 100. When the chip enable signal is in a logic 'high' state, and the memory device 100 corresponds to the 'ready' state, the memory device 100 may enter into a low power standby state.

The write enable signal may be a control signal for controlling a command, an address, and input data, which are input to the memory device 100, to be stored in a latch therein.

The read enable signal may be a control signal for enabling the output of serial data stored in the memory device 100.

The address latch enable signal may be one of control signals used by a host (the host 300 of FIG. 1) to represent what type of signal is input through the input/output lines DQ. In other words, the address latch enable signal may represent that a signal input through the input/output lines DQ is an address.

The command latch enable signal may be one of control signals used by the host to represent that a signal input through the input/output lines DQ is a command.

When the command latch enable signal is activated (e.g., the command latch enable signal has a logic high level or is in a logic high state), the address latch enable signal is inactivated (e.g., in a logic low state), and the write enable signal is activated (e.g., in a logic low state) and then inactivated (e.g., in a logic high state), the memory device 100 may identify that the signal input through the input/output lines DQ is a command.

When the command latch enable signal is inactivated (e.g., in a logic low state), the address latch enable signal is activated (e.g., in a logic high state), and the write enable signal is activated (e.g., in a logic low state) and then inactivated (e.g., in a logic high state), the memory device 100 may identify that the signal input through the input/output lines DQ is an address.

The write prevention signal may be a control signal for inactivating a program operation and an erase operation, which are performed by the memory device 100.

The ready busy signal may be a signal for identifying a status of the memory device 100. The ready busy signal in a logic low state represents that the memory device 100 is performing at least one operation, i.e., the memory device 100 is busy. The ready busy signal in a logic high state represents that the memory device 100 is not performing any operation, i.e., the memory device 100 is ready.

The ready busy signal may be in the low state while the memory device 100 is performing any one of a program operation, a read operation, and the erase operation. In an embodiment of the present disclosure, the memory controller 200 described with reference to FIG. 2 may determine an end time which is a time that a program operation or erase operation is ended based on the ready busy signal.

Figure 4:
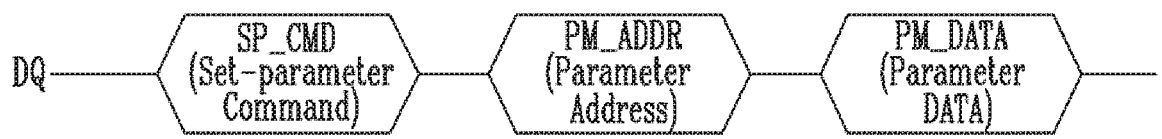
FIG. 4 is a diagram illustrating a method for changing a parameter in accordance with an embodiment of the present disclosure.

FIG. 4 is a diagram illustrating a method for changing a parameter in accordance with an embodiment of the present disclosure. The method of FIG. 4 may be performed by the parameter controller 220 of the memory controller 200 in FIGS. 1 and 2.

Referring to FIG. 4, the parameter controller 220 may store or change a parameter value, using a set parameter command SP_CMD. Specifically, the parameter controller 220 may store a setting value VALUE of parameter data PM_DATA in the memory device 100, based on the set parameter command SP_CMD. Alternatively, the parameter controller 220 may change a parameter value stored in the memory device 100 to the setting value VALUE of the parameter data PM_DATA.

The parameter controller 220 may sequentially provide the memory device 100 with a set parameter command SP_CMD, a parameter address PM_ADDR, and parameter data PM_DATA through the data input/output lines DQ. The memory device 100 may store or change a parameter value, based on a command, an address, and data, which are provided from the parameter controller 220.

When it is necessary to store or change a parameter value, the parameter controller 220 may provide a set parameter command SP_CMD to the memory device 100. When the set parameter command SP_CMD is provided to the memory device 100, the memory device 100 may store a setting value VALUE of parameter data PM_DATA in a register 127 corresponding to a parameter address PM_ADDR. Alternatively, the memory device 100 may change a parameter value stored in the register 127 corresponding to the parameter address PM_ADDR to the setting value VALUE of the parameter data PM_DATA.

In order to store or change the parameter value, the parameter controller 220 may provide the memory device 100 with a parameter address PM_ADDR at which the parameter value is to be stored. The memory device 100 may store the setting value VALUE of the parameter data PM_DATA, which is received from the parameter controller 220, in the register 127 corresponding to the parameter address PM_ADDR.

The parameter controller 220 may store or change a parameter value related to an operation performed by the memory device 100, based on the parameter data PM_DATA provided from the parameter data generator 210. The memory device 100 may perform the operation, based on the stored or changed parameter value.

Figure 5:
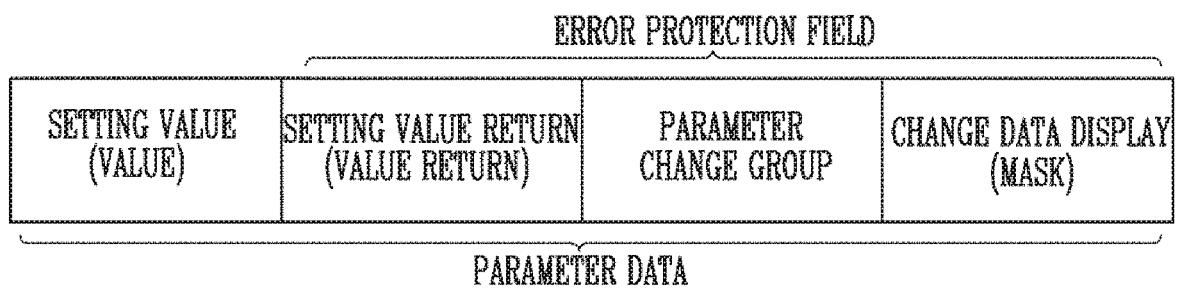
FIG. 5 is a diagram illustrating parameter data including an error protection field in accordance with an embodiment of the present disclosure.

FIG. 5 is a diagram illustrating parameter data including an error protection field in accordance with an embodiment of the present disclosure.

Referring to FIG. 5, the parameter data PM_DATA may include a setting value VALUE and an error protection field. The error protection field may include a setting value return (VALUE RETURN) field, a parameter change group (PARAMETER CHANGE GROUP) field, and a change data display (MASK) field. The parameter data PM_DATA may include at least one of the fields included in the error protection field. When the parameter data PM_DATA does not include the error protection field, the memory device 100 may store a parameter value, which is only included in the parameter data PM_DATA.

In an embodiment, the parameter data PM_DATA may include a setting value VALUE. The setting value VALUE may be a parameter value with which the memory device 100 performs an operation. That is, the setting value VALUE may include a maximum value or minimum value necessary for the operation of the memory device 100. The maximum value or minimum value may be a maximum value or minimum value of the number of times a program pulse is applied or the number of times an erase pulse is applied. Therefore, the parameter data generator 210 may generate parameter data PM_DATA including a parameter value necessary for the operation of the memory device 100. When the setting value VALUE of the parameter data PM_DATA is stored in the memory device 100, the memory device 100 may perform the operation, based on the setting value VALUE.

The parameter data PM_DATA may include an error protection field. The error protection field may include a setting value return (VALUE RETURN) field, a parameter change group (PARAMETER CHANGE GROUP) field, and a change data display (MASK) field. Therefore, the parameter data PM_DATA may include at least one field among the setting value return (VALUE RETURN) field, the parameter change group (PARAMETER CHANGE GROUP) field, and the change data display (MASK) field. When the parameter data PM_DATA includes the error protection field, the memory controller 200 or the memory device 100 may perform an operation for storing or changing a parameter value, based on a value of the error protection field of the parameter data PM_DATA.

In an embodiment, the parameter data PM_DATA may include a setting value return (VALUE RETURN) field. When the parameter setting circuit 126 receives the parameter data PM_DATA from the parameter controller 220, the parameter setting circuit 126 of the memory device 100 may store a setting value VALUE of the parameter data PM_DATA in the register 127 and then request a parameter value stored in the register 127.

The parameter setting circuit 126 may output the parameter value stored in the register 127 to the parameter controller 220. The parameter controller 220 may perform a subsequent operation for setting the parameter value, based on whether the setting value VALUE of the parameter data PM_DATA and the parameter value stored in the register 127 correspond to each other.

The operation performed based on whether the setting value VALUE of the parameter data PM_DATA and the parameter value stored in the register 127 correspond to each other will be described in more detail with reference to FIG. 6.

In an embodiment, the parameter data PM_DATA may include a parameter change group (PARAMETER CHANGE GROUP) field. The parameter change group (PARAMETER CHANGE GROUP) field may represent that an operation performed by the memory device 100 is sorted as a group, and it is determined that a setting value VALUE of the parameter data PM_DATA is a parameter value related to the corresponding operation. The memory device 100 may change the parameter value only when the setting value VALUE of the parameter data PM_DATA is the parameter value related to the corresponding operation.

Specifically, when the parameter setting circuit 126 receives the parameter data PM_DATA including the parameter change group (PARAMETER CHANGE GROUP) field from the parameter controller 220, the parameter setting circuit 126 may check a value of the parameter change group (PARAMETER CHANGE GROUP) field.

After the parameter setting circuit 126 checks the value of the parameter change group (PARAMETER CHANGE GROUP) field, the parameter setting circuit 126 may store a setting value VALUE of the parameter data PM_DATA in the register 127. That is, the memory device 100 may store the setting value VALUE in the register 127, based on whether a field value of an operation to be performed corresponds to the value of the parameter change group (PARAMETER CHANGE GROUP) field. Therefore, the value of the parameter change group (PARAMETER CHANGE GROUP) field is checked before the setting value VALUE of the parameter data PM_DATA is stored in the register 127, so that the memory device 100 may prevent an unintended parameter change.

The value of the parameter change group (PARAMETER CHANGE GROUP) field will be described in more detail with reference to FIG. 7.

In an embodiment, the parameter data PM_DATA may include a change data display (MASK) field. The change data display (MASK) field may represent a position of data to be changed in a parameter stored in the memory device 100. That is, the memory device 100 may change only the data located at the position represented by the change data display (MASK) field, based on the change data display (MASK) field.

Specifically, when the parameter setting circuit 126 receives the parameter data PM_DATA including the change data display (MASK) field from the parameter controller 220, the parameter setting circuit 126 may check a position of a value to be changed in a parameter value of the register 127. That is, the parameter setting circuit 126 may check data at a position to be masked in a setting value of a parameter to be changed. The parameter setting circuit 126 may change only the data at the masked position in the parameter value of the register 127. Only the data at the masked position is changed, so that an unintended parameter change may be prevented.

A method for changing a parameter value according to the change data display (MASK) field will be described in more detail with reference to FIG. 8.

FIG. 6 is a diagram illustrating operations of a memory device and a memory controller when a setting value return field is included in parameter data in accordance with an embodiment of the present disclosure. The operations of FIG. 6 may be performed by the memory device 100 and the memory controller 200 in FIGS. 1 and 2.

Referring to FIG. 6, an operation for normally storing a setting value VALUE of the parameter data PM_DATA in the register 127 is illustrated. That is, a method for normally storing the setting value of the parameter data PM_DATA when the setting value VALUE is abnormally stored in the memory device 100 is illustrated.

Specifically, FIG. 6 illustrates an operation after the parameter controller 220 outputs a set parameter command SP_CMD, a parameter address PM_ADDR, and parameter data PM_DATA to the parameter setting circuit 126 of the memory device 100.

In an embodiment, the parameter setting circuit 126 may perform an operation corresponding to the set parameter command SP_CMD. The parameter setting circuit 126 may store a setting value VALUE of the parameter data PM_DATA in the register 127 (①). The memory device 100 may perform the operation, based on a parameter value stored in the register 127.

After the setting value VALUE of the parameter data PM_DATA is stored in the register 127, the parameter value stored in the register 127 may be output. In an embodiment, when the parameter data PM_DATA includes a setting value return (VALUE RETURN) field, the parameter setting circuit 126 may request the parameter value stored in the register 127 and the register 127 may output the parameter value corresponding the request of the parameter setting circuit 126.

When the parameter data PM_DATA includes the setting value return (VALUE RETURN) field, the parameter controller 220 may receive the parameter value stored in the memory device 100, based on a value of the setting value return (VALUE RETURN) field. Specifically, the value of the setting value return (VALUE RETURN) field may be 0 or 1. The parameter setting circuit 126 may acquire the parameter value stored in the register 127 (②).

When the value of the setting value return (VALUE RETURN) field may be 0, the parameter setting circuit 126 may request the parameter value stored in the register 127. When the value of the setting value return (VALUE RETURN) field may be 1, the parameter setting circuit 126 may store the setting value VALUE in the register 127. Then, the operation corresponding to the set parameter command SP_CMD may be ended.

In another embodiment, when the value of the setting value return (VALUE RETURN) field is 1, the parameter setting circuit 126 may request the parameter value stored in the register 127. When the value of the setting value return (VALUE RETURN) field is 0, the parameter setting circuit 126 may store the setting value VALUE in the register 127. Then, the operation corresponding to the set parameter command SP_CMD may be ended.

The parameter setting circuit 126 may output the parameter value received from the register 127 to the parameter controller 220 (③). The parameter controller 220 may compare the setting value VALUE of the parameter data PM_DATA provided to the parameter setting circuit 126 with the parameter value received from the parameter setting circuit 126. The parameter controller 220 may perform a subsequent operation, based on the comparison result of the setting value VALUE in the parameter data PM_DATA with the parameter value received from the parameter setting circuit 126.

Specifically, the setting value VALUE in the parameter data PM_DATA, which the parameter setting circuit 126 receives from the parameter controller 220, may be equal to the parameter value stored in the register 127. Since the parameter value to be set by the parameter controller 220 is stored, the parameter controller 220 may not perform the subsequent operation.

However, an unintended change of the parameter value may occur due to an abnormal change of power such as Sudden Power Off (SPO). That is, when the setting value VALUE of the parameter data PM_DATA is different from the parameter value stored in the register 127, the parameter controller 220 may perform the subsequent operation. Specifically, in order to re-store a setting value VALUE to be stored by the parameter controller 220 in the memory device 100, the parameter controller 220 may output the set parameter command SP_CMD to the parameter setting circuit 126 (④). The parameter controller 220 may re-output, to the parameter setting circuit 126, the parameter address PM_ADDR and the parameter data PM_DATA in addition to the set parameter command SP_CMD.

Conventionally, after a parameter value to be set was stored in the register 127 through the set parameter command SP_CMD, the parameter value stored in the register 127 was checked through a get parameter command GP_CMD. After the memory controller 200 outputted the set parameter command SP_CMD to the memory device 100, the memory controller 200 outputted the get parameter command GP_CMD, if necessary. However, in the present invention, the setting value return (VALUE RETURN) field is included in the parameter data PM_DATA output through the set parameter command SP_CMD, so that the parameter value stored in the register 127 may be checked without outputting a separate get parameter command GP_CMD to the memory device 100. Thus, the parameter controller 220 may check the parameter value stored in the register 127 without outputting the get parameter command GP_CMD to the memory device 100.

FIG. 7 is a diagram illustrating a parameter change group field in accordance with an embodiment of the present disclosure, for example, the parameter change group field shown in FIG. 5.

Referring to FIGS. 5 and 7, the parameter data PM_DATA may include a parameter change group (PARAMETER CHANGE GROUP) field. The parameter change group (PARAMETER CHANGE GROUP) field may be sorted based on a corresponding operation performed by the memory device 100. In an embodiment, the corresponding operation may be a program operation, a read operation, or an erase operation. The parameter change group (PARAMETER CHANGE GROUP) field may be sorted based on various operations in addition to the operation performed by the memory device 100. Hereinafter, the parameter change group (PARAMETER CHANGE GROUP) field will be described based on the program operation, the read operation, or the erase operation.

The parameter data PM_DATA may include a parameter change group (PARAMETER CHANGE GROUP) field. The parameter change group (PARAMETER CHANGE GROUP) field may represent that an operation performed by the memory device 100 is sorted as a group, and it is determined whether a setting value VALUE of the parameter data PM_DATA is a parameter value related to the corresponding operation. When the setting value VALUE of the parameter data PM_DATA is the parameter value related to the corresponding operation, the memory device 100 may store the setting value VALUE in the register 127 or change a parameter value in the register 127 to the setting value VALUE. A value of the parameter change group (PARAMETER CHANGE GROUP) field is checked before the setting value VALUE in the parameter data PM_DATA is stored in the register 127, so that the memory device 100 may prevent an unintended parameter change.

Specifically, the parameter setting circuit 126 may receive the parameter data PM_DATA including the parameter change group (PARAMETER CHANGE GROUP) field. A value of the parameter change group (PARAMETER CHANGE GROUP) field, which corresponds to a program operation PROGRAM, may be "0." A value of the parameter change group (PARAMETER CHANGE GROUP) field, which corresponds to a read operation READ, may be "1." A value of the parameter change group (PARAMETER CHANGE GROUP) field, which corresponds to an erase operation ERASE, may be "2."

The parameter setting circuit 126 may check whether the operation to be performed by the memory device 100 is identical to the operation corresponding to the value of the parameter change group (PARAMETER CHANGE GROUP) field. That is, the parameter setting circuit 126 may store the setting value VALUE in the register 127 by checking the value of the parameter change group (PARAMETER CHANGE GROUP) field.

In an embodiment, the operation to be performed by the memory device 100 may be the program operation PROGRAM. Therefore, the parameter setting circuit 126 may store the setting value VALUE in the register 127 only when the value of the parameter change group (PARAMETER CHANGE GROUP) field in the parameter data PM_DATA is "0."

That is, when the operation to be performed by the memory device 100 is different from the operation corresponding to the value of the parameter change group (PARAMETER CHANGE GROUP) field included in the parameter data PM_DATA, the parameter setting circuit 126 may not store the setting value VALUE in the register 127. That is, the parameter setting circuit 126 may discard the set parameter command SP_CMD received from the parameter controller 220. Specifically, if the value of the parameter change group (PARAMETER CHANGE GROUP) field in the parameter data PM_DATA is "1" or "2" when the operation to be performed by the memory device 100 is the program operation PROGRAM, the parameter setting circuit 126 may not store the setting value VALUE in the register 127.

In an embodiment, the operation to be performed by the memory device 100 may be the read operation READ. Therefore, when the value of the parameter change group (PARAMETER CHANGE GROUP) field in the parameter data PM_DATA is "1," the parameter setting circuit 126 may store the setting value VALUE in the register 127. When the value of the parameter change group (PARAMETER CHANGE GROUP) field in the parameter data PM_DATA is not "1," the parameter setting circuit 126 may not store the setting value VALUE in the register 127.

In an embodiment, the operation to be performed by the memory device 100 may be the erase operation ERASE. Therefore, when the value of the parameter change group (PARAMETER CHANGE GROUP) field in the parameter data PM_DATA is "2," the parameter setting circuit 126 may store the setting value VALUE in the register 127. When the value of the parameter change group (PARAMETER CHANGE GROUP) field in the parameter data PM_DATA is not "2," the parameter setting circuit 126 may not store the setting value VALUE in the register 127.

FIG. 8 is a diagram illustrating a change data display field in accordance with an embodiment of the present disclosure, for example, the change data display (MASK) field shown in FIG. 5 and a method for changing a parameter according to the change data display field. For example, the method of FIG. 8 may be performed by the memory device 100 and the memory controller 200 in FIG. 6.

By way of example, FIG. 8 illustrates a method for, after the setting value VALUE in the parameter data PM_DATA is stored in the register 127, changing the setting value VALUE stored in the register 127 to another value. Referring to FIGS. 5 and 8, the parameter data PM_DATA may include a change data display (MASK) field.

The change data display (MASK) field may include data for masking a position of data to be changed in a parameter value stored in the register 127. The parameter setting circuit 126 may change a parameter value stored in the register 127, based on data of the change data display (MASK) field. In an embodiment, a position masked in the data of the change data display (MASK) field may be represented as "F." The change data display (MASK) field may be configured identically to the parameter value stored in the register 127, except the masked position.

In FIG. 8, the parameter data PM_DATA includes a setting value VALUE, a target parameter value TARGET, and a change data display (MASK) field.

In an embodiment, the parameter setting circuit 126 may store, in the register 127, a setting value VALUE in the parameter data PM_DATA received from the parameter controller 220. For example, the setting value VALUE may be "0X30", and the setting value VALUE may be stored in the register 127.

The parameter setting circuit 126 may receive a set parameter command SP_CMD for changing a parameter value in the register 127 from the parameter controller 220. The parameter value in the register 127 may be changed to a target parameter value TARGET, based on the set parameter command SP_CMD. Therefore, "0X30" may be changed to "0X50." The parameter setting circuit 126 may change the parameter value by receiving the set parameter command SP_CMD, a parameter address PM_ADDR, and the parameter data PM_DATA. The setting value VALUE in the parameter data PM_DATA may be the target parameter value TARGET.

However, an unintended change of a parameter value may occur due to an abnormal change of power such as Sudden Power Off (SPO). In order to prevent such a change of the parameter value, the parameter data PM_DATA may include a change data display (MASK) field. When the change data display (MASK) field is included in the parameter data PM_DATA, the parameter setting circuit 126 may change a value at a position represented by the change data display (MASK) field in data stored in the register 127.

Specifically, after the setting value VALUE "0X30" is stored in the register 127, the parameter setting circuit 126 may receive the parameter data PM_DATA including the setting value VALUE. The parameter setting circuit 126 may change only data at a position masked in a parameter setting value to be changed. The parameter setting circuit 126 may change "3" at the masked position in the parameter value stored in the register 127 to "5." Thus, values except "3" that is a value to be changed, are not changed, so that an unintended change of a parameter value may be prevented.

Figure 9:
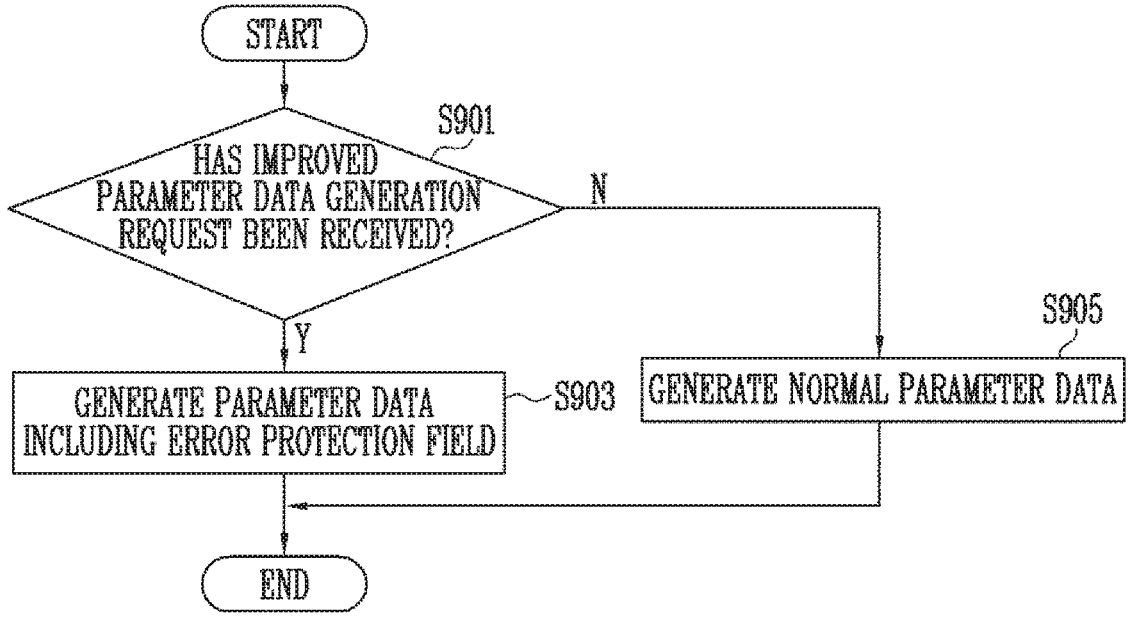
FIG. 9 is a diagram illustrating an operation of a memory controller in accordance with an embodiment of the present disclosure.

FIG. 9 is a diagram illustrating an operation of a memory controller in accordance with an embodiment of the present disclosure, for example, the memory controller 200 of FIGS. 1 to 8.

Referring to FIG. 9, at step S901, the parameter data generator 210 may determine whether an improved parameter data generation request has been received in the memory controller 200. When it is determined that a parameter change is necessary based on an internal operation of the memory controller 200, the parameter data generator 210 may generate parameter data PM_DATA, based on the improved parameter data generation request. The internal operation of the memory controller 200 may be performed based on an operation performed by the memory device 100.

When the parameter data generator 210 receives the improved parameter data generation request (S903, Y), the operation proceeds to step S903. When the parameter data generator 210 does not receive the improved parameter data generation request (S903, N), the operation proceeds to step S905.

At the step S903, the parameter data generator 210 may generate parameter data PM_DATA including an error protection field. The error protection field may be a field added to prevent a storage or change of an unintended parameter. A storage or change of an unintended parameter may occur due to an abnormal change of power such as Sudden Power Off (SPO). That is, in a storage or change of a parameter, the error protection field may be added to the parameter data PM_DATA so as to store or change a normal parameter. The error protection field may include a setting value return (VALUE RETURN) field, a parameter change group (PARAMETER CHANGE GROUP) field, and a change data display (MASK) field.

At the step S905, the parameter data generator 210 may generate normal parameter data. The normal parameter data may not include the error protection field. Specifically, if the parameter data generator 210 does not receive the improved parameter data generation request when it is determined that a parameter change is necessary, the parameter data generator 210 may generate normal parameter data that does not include the error protection field. When the parameter data generator 210 outputs the normal parameter data to the parameter controller 220, the parameter controller 220 may set a parameter value, which is included in the normal parameter data.

Figure 10:
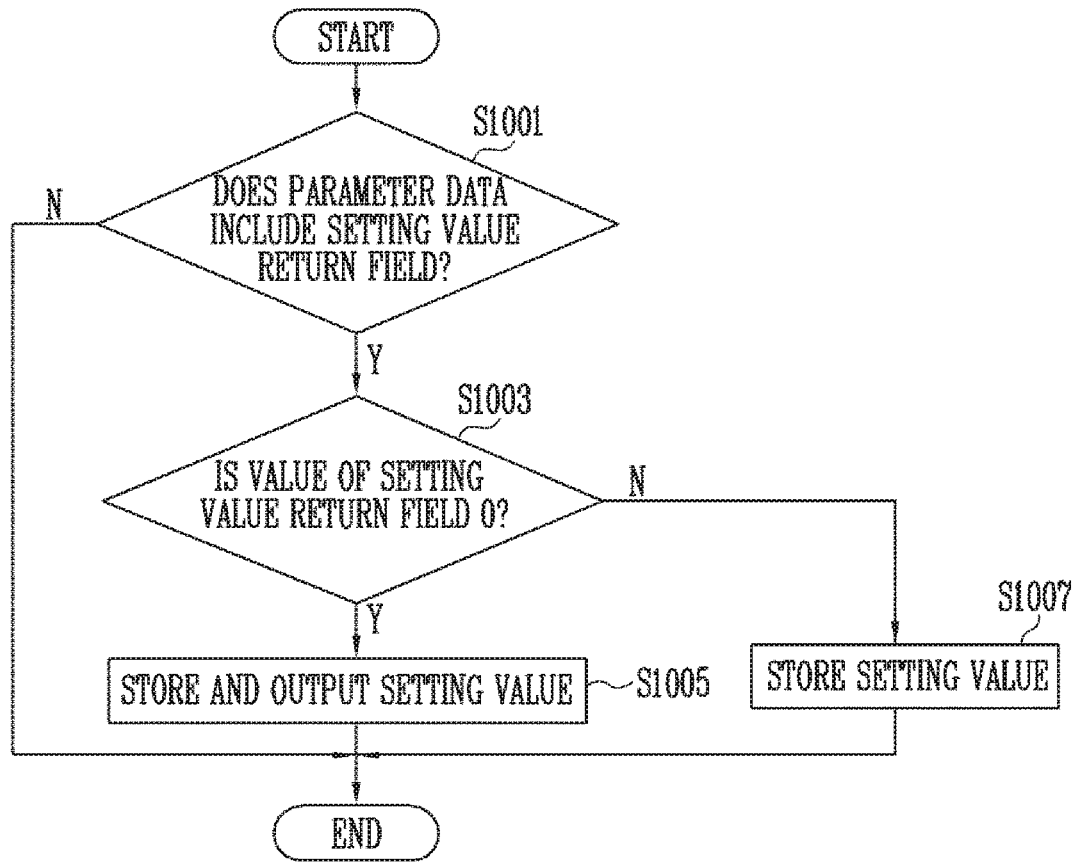
FIG. 10 is a diagram illustrating an operation of a memory device in accordance with an embodiment of the present disclosure.

FIG. 10 is a diagram illustrating an operation of a memory device in accordance with an embodiment of the present disclosure, for example, the memory device 100 of FIGS. 1 to 8.

Referring to FIG. 10, at step S1001, it may be determined whether parameter data PM_DATA includes a setting value return (VALUE RETURN) field. The parameter data PM_DATA may include an error protection field. The error protection field may include at least one of the setting value return (VALUE RETURN) field, a parameter change group (PARAMETER CHANGE GROUP) field, and a change data display (MASK) field. When it is determined that the parameter data PM_DATA includes the setting value return (VALUE RETURN) field, the operation proceeds to step S1003.

At the step S1003, it may be determined whether a value of the setting value return (VALUE RETURN) field is 0. Specifically, the value of the setting value return (VALUE RETURN) field may be 0 or 1. The parameter setting circuit 126 may perform an operation for storing a setting value VALUE in the register 127, based on the value of the setting value return (VALUE RETURN) field. When it is determined that the value of the setting value return (VALUE RETURN) field is 0 (S1003, Y), the operation proceeds to step S1005. When it is determined that the value of the setting value return (VALUE RETURN) field is not 0 (S1003, N), the operation proceeds to step S1007.

At the step S1005, when it is determined that the value of the setting value return (VALUE RETURN) field is 0, the parameter setting circuit 126 may store a setting value VALUE of the parameter data PM_DATA in the register 127. After the parameter setting circuit 126 stores the setting value VALUE in the register 127, the parameter setting circuit 126 may request a parameter value stored in the register 127. The parameter setting circuit 126 may output the parameter value received from the register 127 to the parameter controller 220.

The parameter controller 220 may compare the setting value VALUE of the parameter data PM_DATA, which is provided to the parameter setting circuit 126, with a parameter value received from the parameter setting circuit 126. The parameter controller 220 may perform a subsequent operation, based on the comparison result of the setting value VALUE of the parameter data PM_DATA with the parameter value received from the parameter setting circuit 126.

At the step S1007, when it is determined that the value of the setting value return (VALUE RETURN) field is not 0, then the value of the setting value return (VALUE RETURN) field is 1. The parameter setting circuit 126 may store the setting value VALUE of the parameter data PM_DATA in the register 127. If the parameter setting circuit 126 stores the setting value VALUE in the register 127 when the value of the setting value return (VALUE RETURN) field is 1, an operation corresponding to a set parameter command SP_CMD may be ended.

Figure 11:
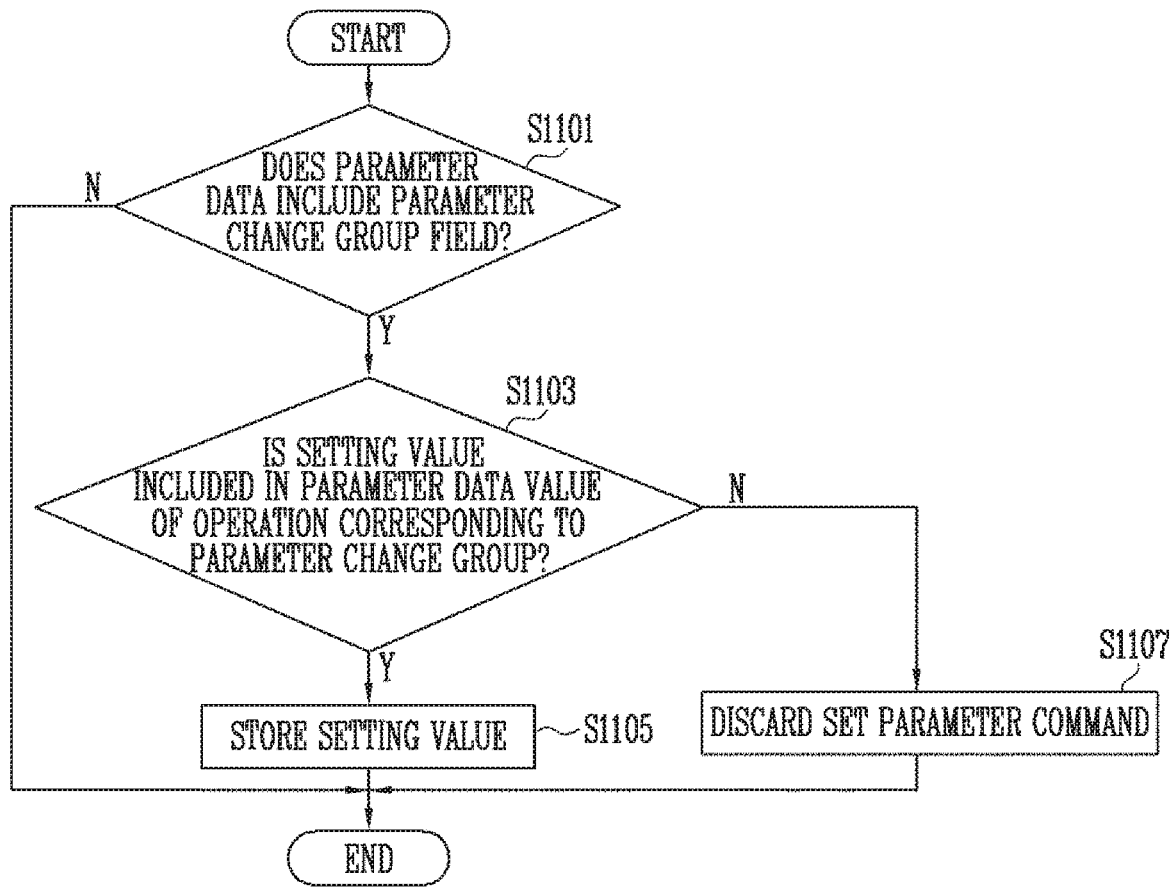
FIG. 11 is a diagram illustrating an operation of a memory device in accordance with an embodiment of the present disclosure.

FIG. 11 is a diagram illustrating an operation of a memory device in accordance with an embodiment of the present disclosure, for example, the memory device 100 of FIGS. 1 to 8.

Referring to FIG. 11, at step S1101, it may be determined whether parameter data PM_DATA includes a parameter change group (PARAMETER CHANGE GROUP) field. The parameter data PM_DATA may include an error protection field. The error protection field may include at least one of a setting value return (VALUE RETURN) field, the parameter change group (PARAMETER CHANGE GROUP) field, and a change data display (MASK) field. When the parameter data PM_DATA includes the parameter change group (PARAMETER CHANGE GROUP) field, the operation proceeds to step S1103.

At the step S1103, it may be determined whether a setting value VALUE of the parameter data PM_DATA is a value of an operation corresponding to a parameter change group PARAMETER CHANGE GROUP.

The parameter change group (PARAMETER CHANGE GROUP) field may represent that an operation performed by the memory device 100 is sorted as a group, and it is determined whether a setting value VALUE of the parameter data PM_DATA is a parameter value related to the corresponding operation. When the setting value VALUE of the parameter data PM_DATA is the parameter value related to the corresponding operation, the memory device 100 may store the setting value VALUE in the register 127 or change a parameter value stored in the register 127 to the setting value VALUE. A value of the parameter change group (PARAMETER CHANGE GROUP) field is checked before the setting value VALUE of the parameter data PM_DATA is stored in the register 127, so that the memory device 100 may prevent an unintended parameter change.

When it is determined that the setting value VALUE of the parameter data PM_DATA is the value of the operation corresponding to the parameter change group PARAMETER CHANGE GROUP (S1103, Y), the operation proceeds to step S1105. When it is determined that the setting value VALUE of the parameter data PM_DATA is not the value of the operation corresponding to the parameter change group PARAMETER CHANGE GROUP (S1103, N), the operation proceeds to step S1107.

At the step S1105, the parameter setting circuit 126 may store the setting value VALUE included in the parameter data PM_DATA in the register 127. That is, when an operation to be performed by the memory device 100 and an operation corresponding to the value of the parameter change group (PARAMETER CHANGE GROUP) field are identical to each other, the parameter setting circuit 126 may store the setting value VALUE in the register 127.

At the step S1107, the parameter setting circuit 126 may discard a set parameter command SP_CMD received from the parameter controller 220. That is, when the operation to be performed by the memory device 100 and the operation corresponding to the value of the parameter change group (PARAMETER CHANGE GROUP) field are different from each other, the parameter setting circuit 126 may not store the setting value VALUE in the register 127.

Figure 12:
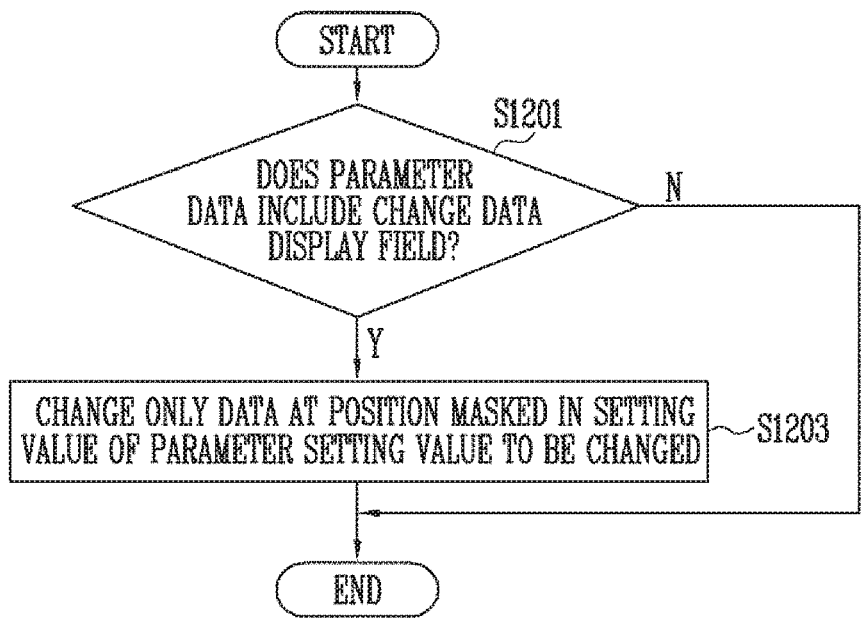
FIG. 12 is a diagram illustrating an operation of a memory device in accordance with an embodiment of the present disclosure.

FIG. 12 is a diagram illustrating an operation of a memory device in accordance with an embodiment of the present disclosure, for example, the memory device 100 of FIGS. 1 to 8.

Referring to FIG. 12, at step S1201, it may be determined whether parameter data PM_DATA includes a change data display (MASK) field. The parameter data PM_DATA may include an error protection field. The error protection field may include at least one of a setting value return (VALUE RETURN) field, a parameter change group (PARAMETER CHANGE GROUP) field, and the change data display (MASK) field. When it is determined that the parameter data PM_DATA includes the change data display (MASK) field, the operation proceeds to step S1203.

At the step S1203, the parameter setting circuit 126 may change only data at a position masked in a parameter setting value to be changed by receiving the parameter data PM_DATA. The parameter setting circuit 126 may change only data at a position masked in a parameter value stored in the register 127. Thus, values except the value to be changed are not changed, so that an unintended change of a parameter value may be prevented.

Figure 13:
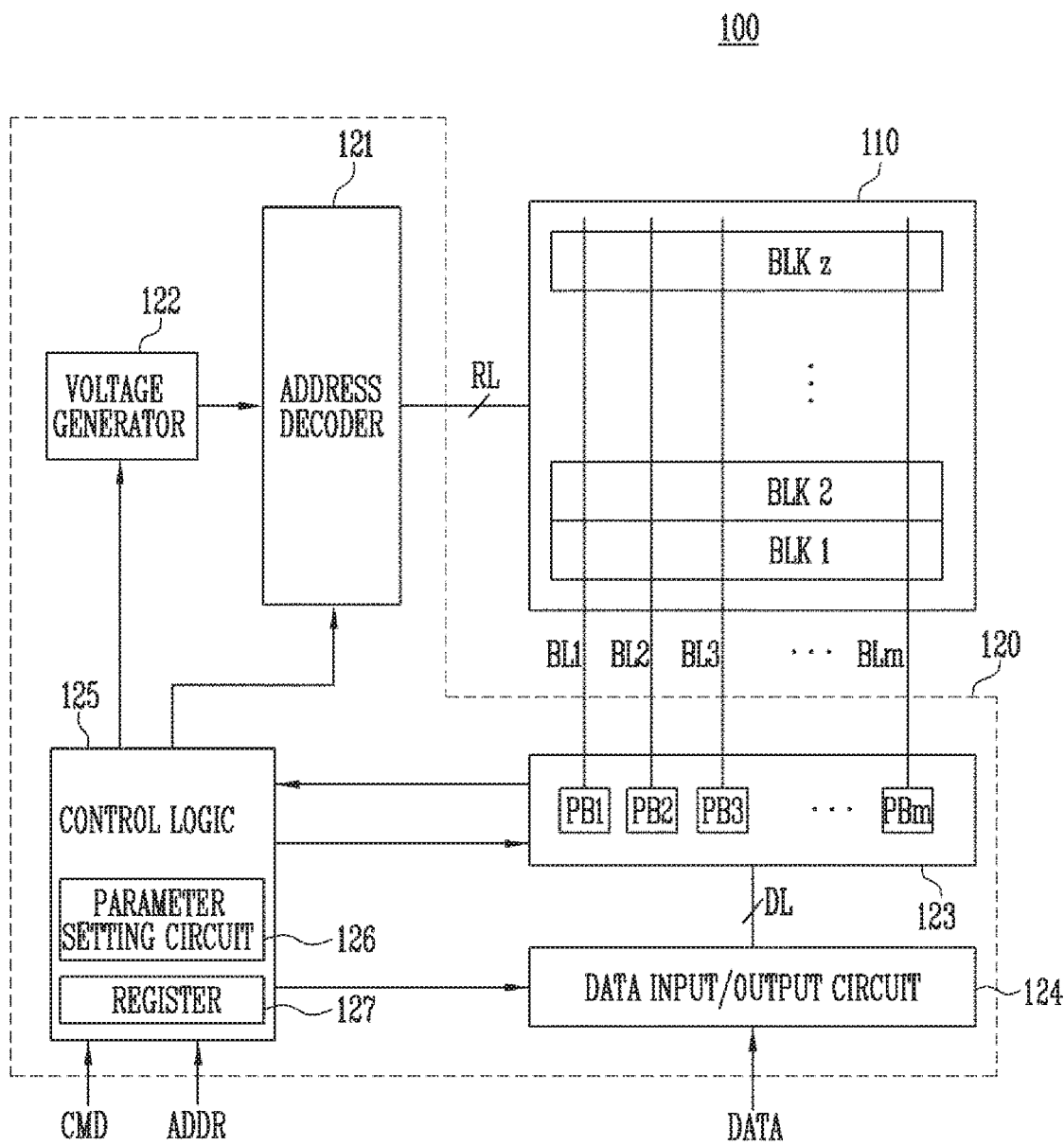
FIG. 13 is a block diagram illustrating a structure of a memory device shown in FIG. 1.

FIG. 13 is a block diagram illustrating a structure of a memory device in accordance with an embodiment of the present disclosure, for example, the memory device 100 shown in FIG. 1.

Referring to FIG. 13, the memory device 100 includes a memory cell array 110, and a peripheral circuit 120. The peripheral circuit 120 includes an address decoder 121, a voltage generator 122, a read and write (read/write) circuit 123, a data input and output (input/output) circuit 124, and a control logic 125.

The memory cell array 110 may include a plurality of memory blocks BLK1 to BLKz. The plurality of memory blocks BLK1 to BLKz are coupled to an address decoder 121 through row lines RL, and are coupled to the read/write circuit 123 through bit lines BL1 to BLm. Each of the plurality of memory blocks BLK1 to BLKz includes a plurality of memory cells. In an embodiment, the plurality of memory cells are nonvolatile memory cells.

A plurality of memory cells in the memory cell array 110 may be divided into a plurality of blocks according to usage thereof. System information has various setting information necessary to control the memory device 100 and may be stored in the plurality of blocks.

Each of first to z-th memory blocks BLK1 to BLKz includes a plurality of cell strings. First to m-th cell strings are coupled to first to m-th bit lines BL1 to BLm, respectively. Each of the first to m-th cell strings includes a drain select transistor, a plurality of memory cells coupled in series, and a source select transistor. The drain select transistor is coupled to a drain select line. First to n-th memory cells are coupled to first to n-th word lines. The source select transistor is coupled to a source select line. A drain side of the drain select transistor is coupled to a corresponding bit line. The drain select transistors of the first to m-th cell strings are coupled to the first to m-th bit lines BL1 to BLm, respectively. A source side of the source select transistor is coupled to a common source line. In an embodiment, the common source line may be commonly coupled to the first to z-th memory blocks BLK1 to BLKz. The drain select line DSL, the first to nth word lines, and the source select line are included in the row lines RL. The drain select line DSL, the first to nth word lines, and the source select line are controlled by the address decoder 121. The common source line is controlled by the control logic 125. The first to m-th bit lines BL1 to BLm are controlled by the read/write circuit 123.

The address decoder 121 is coupled to the memory cell array 110 through the row lines RL. The address decoder 121 is configured to operate under the control of the control logic 125. The address decoder 121 receives an address ADDR through the control logic 125.

In an embodiment, a program operation and a read operation of the memory device 100 are performed in units of pages.

In the program and read operations, the address ADDR received by the control logic 125 may include a block address and a row address. The address decoder 121 is configured to decode the block address in the received address ADDR. The address decoder 121 selects one memory block among the memory blocks BLK1 to BLKz according to the decoded block address.

The address decoder 121 is configured to decode the row address in the received address ADDR. The address decoder 121 selects one word line of a selected memory block by applying voltages provided from the voltage generator 122 to the row lines RL according to the decoded row address.

In an erase operation, the address ADDR includes a block address. The address decoder 121 decodes the block address, and selects one memory block according to the decoded block address. The erase operation may be performed on the whole or a portion of the one memory block.

In a partial erase operation, the address ADDR may include block and row addresses. The address decoder 121 selects one memory block among the memory blocks BLK1 to BLKz according to the block address.

The address decoder 121 is configured to decode the row addresses in the received address ADDR. The address decoder 121 selects at least one word line of the selected memory block by applying voltages provided from the voltage generator 122 to the row lines RL according to the decoded row addresses.

In an embodiment, the address decoder 121 may include a block decoder, a word line decoder, an address buffer, and the like.

The voltage generator 122 generates a plurality of voltages, using an external power voltage supplied to the memory device 100. The voltage generator 122 operates under the control of the control logic 125.

In an embodiment, the voltage generator 122 may generate an internal power voltage by regulating the external power voltage. The internal power voltage generated by the voltage generator 122 is used as an operating voltage of the memory device 100.

In an embodiment, the voltage generator 122 may generate a plurality of voltages, using the external power voltage or the internal power voltage.

For example, the voltage generator 122 may include a plurality of pumping capacitors for receiving the internal power voltage, and generate a plurality of voltages by selectively activating the plurality of pumping capacitors under the control of the control logic 130. The plurality of generated voltages are applied to word lines selected by the address decoder 121.

In a program operation, the voltage generator 122 may generate a high-voltage program pulse and a pass pulse lower than the program pulse. In a read operation, the voltage generator 122 may generate a read voltage and a pass voltage higher than the read voltage. In an erase operation, the voltage generator 122 may generate an erase voltage.

The read/write circuit 123 includes first to m-th page buffers PB1 to PBm. The first to m-th page buffers PB1 to PBm are coupled to the memory cell array 110 respectively through the first to m-th bit lines BL1 to BLm. The first to m-th page buffers PB1 to PBm operate under to control of the control logic 125.

The first to m-th page buffers PB1 to PBm communicate data with the data input/output circuit 124. In a program operation, the first to m-th page buffers PB1 to PBm receive data DATA to be stored through the data input/output circuit 124 and data lines DL.

In a program operation, when a program pulse is applied to a selected word line, the first to m-th page buffers PB1 to PBm may transfer the data DATA received through the data input/out circuit 124 to selected memory cells through the bit lines BL1 to BLm. Memory cells of a selected page are programmed according to the transferred data DATA. A memory cell coupled to a bit line to which a program allow voltage (e.g., a ground voltage) is applied may have an increased threshold voltage. A threshold voltage of a memory cell coupled to a bit line to which a program inhibit voltage (e.g., a power voltage) is applied may be maintained. In a program verify operation, the first to m-th page buffers PB1 to PBm read page data from selected memory cells through the bit lines BL1 to BLm.

In a read operation, the read/write circuit 123 reads data DATA from memory cells of a selected page through the bit lines BL, and outputs the read data DATA to the data input/output circuit 124. In an erase operation, the read/write circuit 123 may float the bit lines BL.

In an embodiment, the read/write circuit 123 may include a column select circuit.

The data input/output circuit 124 is coupled to the first to m-th page buffers PB1 to PBm through the data lines DL. The data input/output circuit 124 operates under the control of the control logic 125. In a program operation, the data input/output circuit 124 receives data DATA to be stored from an external controller (not shown).

The control logic 125 is coupled to the address decoder 121, the voltage generator 122, the read/write circuit 123, and the data input/output circuit 124. The control logic 125 may control overall operations of the memory device 100. The control logic 125 receives a command CMD and an address ADDR. The control logic 125 controls the address decoder 121, the voltage generator 122, the read/write circuit 123, and the data input/output circuit 124 in response to the command CMD.

The control logic 125 may include a parameter setting circuit 126.

In an embodiment, the parameter setting circuit 126 may set a parameter value necessary for an operation performed by the memory device 100. Specifically, the parameter setting circuit 126 may set a parameter value necessary for any one operation among a program operation, a read operation, and an erase operation. The memory device 100 may perform any one operation among the program operation, the read operation, and the erase operation, based on the set parameter value.

In an embodiment, when parameter data PM_DATA received from the memory controller 200 includes an error protection field, the parameter setting circuit 126 may perform an operation for storing a setting value VALUE in the parameter data PM_DATA, based on a value of the error protection field. Therefore, the parameter setting circuit 126 may perform an operation for storing the setting value VALUE in the parameter data PM_DATA according to whether a setting value return (VALUE RETURN) field, a parameter change group (PARAMETER CHANGE GROUP) field, or a change data display (MASK) field is included in the error protection field.

The control logic 125 may include a register 127.

In an embodiment, the register 127 may receive a setting value VALUE from the parameter setting circuit 126. The register 127 may store the setting value VALUE. The register 127 may output a stored parameter value in response to a request of the parameter setting circuit 126.

Figure 14:
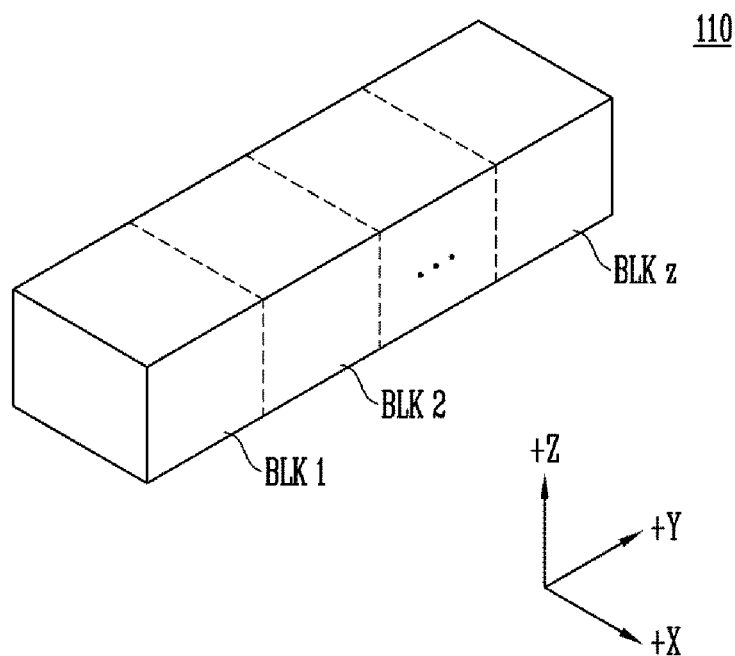
FIG. 14 is a diagram illustrating an example of a memory cell array in accordance with an embodiment of the present disclosure.

FIG. 14 is a diagram illustrating an example of a memory cell array in accordance with an embodiment of the present disclosure, for example, the memory cell array 110 shown in FIG. 13.

Referring to FIG. 14, the memory cell array 110 may include a plurality of memory blocks BLK1 to BLKz. Each memory block may have a three-dimensional structure. Each memory block may include a plurality of memory cells stacked on a substrate (not shown). The plurality of memory cells may be arranged along +X, +Y, and +Z directions. A structure of each memory block will be described in more detail with reference to FIGS. 15 and 16.

Figure 15:
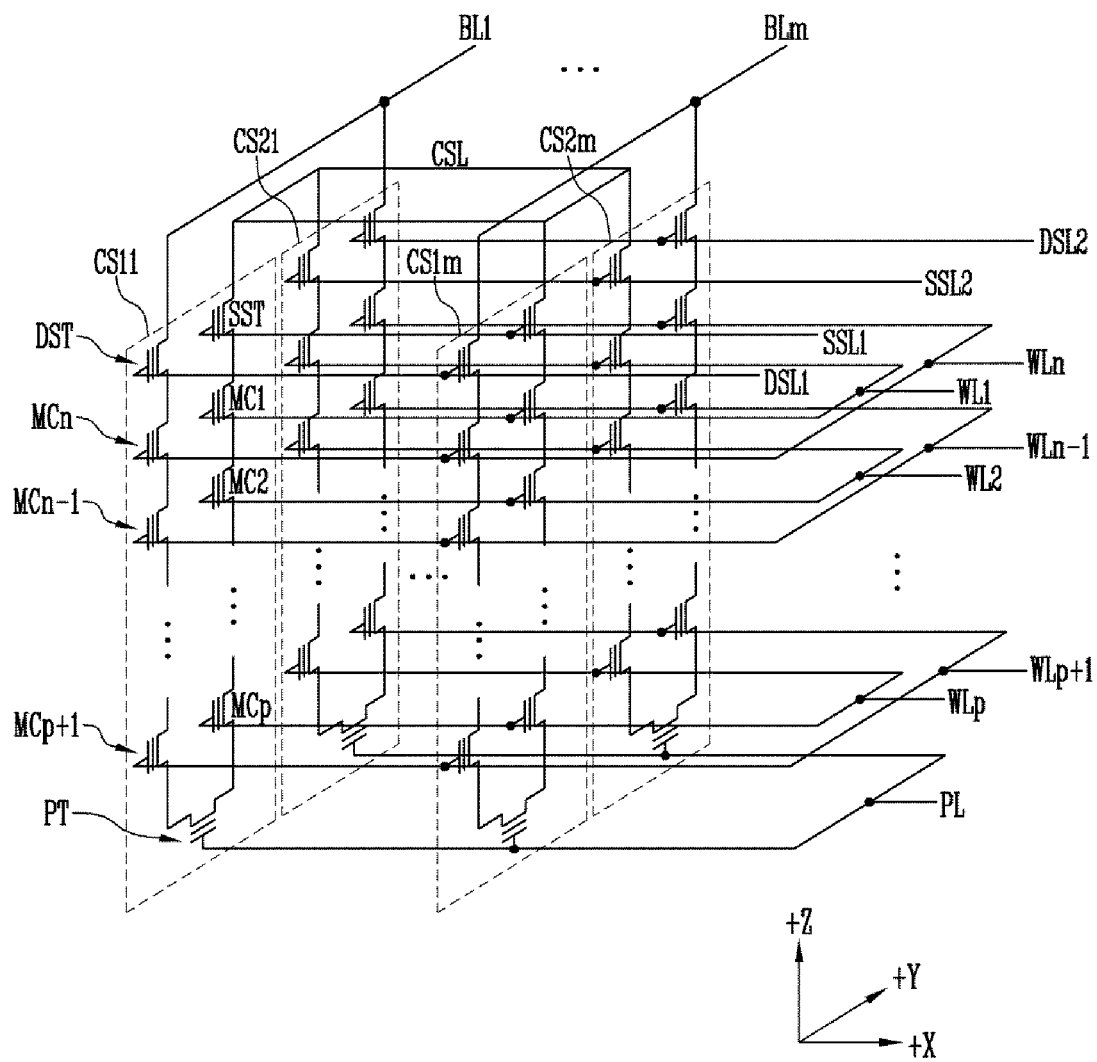
FIG. 15 is a circuit diagram illustrating a memory block among a plurality of memory blocks.

FIG. 15 is a circuit diagram illustrating any one memory block BLKa among the memory blocks BLK1 to BLKz shown in FIG. 14.

Referring to FIG. 15, the memory block BLKa may include a plurality of cell strings CS11 to CS1$m$ and CS21 to CS2$m$. In an embodiment, each of the plurality of cell strings CS11 to CS1$m$ and CS21 to CS2$m$ may be formed in a 'U' shape. In the memory block BLKa, m cell strings are arranged in a row direction (i.e., a +X direction). FIG. 15 illustrates two cell strings arranged in a column direction (i.e., a +Y direction). However, this is for convenience, and it will be understood that three cell strings may be arranged in the column direction.

Each of the plurality of cell strings CS11 to CS1$m$ and CS21 to CS2$m$ may include at least one source select transistor SST, first to n-th memory cells MC1 to MCn, a pipe transistor PT, and at least one drain select transistor DST.

The select transistors SST and DST and the memory cells MC1 to MCn may have structures similar to one another. In an embodiment, each of the select transistors SST and DST and the memory cells MC1 to MCn may include a channel layer, a tunneling insulating layer, a charge storage layer, and a blocking insulating layer. In an embodiment, a pillar for providing the channel layer may be provided in each cell string. In an embodiment, a pillar for providing at least one of the channel layer, the tunneling insulating layer, the charge storage layer, and the blocking insulating layer may be provided in each cell string.

The source select transistor SST of each cell string is coupled between a common source line CSL and memory cells MC1 to MCp.

In an embodiment, the source select transistors of cell strings arranged on the same row are coupled to a source select line extending in the row direction, and the source select transistors of cell strings arranged on different rows are coupled to different source select lines. In FIG. 15, the source select transistors of the cell strings CS11 to CS1*m* on a first row are coupled to a first source select line SSL1. The source select transistors of the cell strings CS21 to CS2*m* on a second row are coupled to a second source select line SSL2.

In another embodiment, the source select transistors of the cell strings CS11 to CS1*m* and CS21 to CS2*m* may be commonly coupled to one source select line.

The first to n-th memory cells MC1 to MCn of each cell string are coupled between the source select transistor SST and the drain select transistor DST.

The first to n-th memory cells MC1 to MCn may be divided into first to p-th memory cells MC1 to MCp and a (p+1)-th to n-th memory cells MCp+1 to MCn. The first to p-th memory cells MC1 to MCp are sequentially arranged in the opposite direction of a +Z direction, and are coupled in series between the source select transistor SST and the pipe transistor PT. The (p+1)-th to n-th memory cells MCp+1 to MCn are sequentially arranged in the +Z direction, and are coupled in series between the pipe transistor PT and the drain select transistor DST. The first to p-th memory cells MC1 to MCp and the (p+1)-th to n-th memory cells MCp+1 to MCn are coupled through the pipe transistor PT. Gate electrodes of the first to nth memory cells MC1 to MCn of each cell string are coupled to first to n-th word lines WL1 to WLn, respectively.

A gate of the pipe transistor PT of each cell string is coupled to a pipe line PL.

The drain select transistor DST of each cell string is coupled between a corresponding bit line and the memory cells MCp+1 to MCn. Cell strings arranged in the row direction are coupled to a drain select line extending in the row direction. The drain select transistors of the cell strings CS11 to CS1*m* on the first row are coupled to a first drain select line DSL1. The drain select transistors of the cell strings CS21 to CS2*m* on the second row are coupled to a second drain select line DSL2.

Cell strings arranged in the column direction are coupled to a bit line extending in the column direction. In FIG. 15, the cell strings CS11 and CS21 on a first column are coupled to a first bit line BL1. The cell strings CS1*m* and CS2*m* on an m-th column are coupled to an m-th bit line BLm.

Memory cells coupled to the same word line in the cell strings arranged in the row direction constitute one page. For example, memory cells coupled to the first word line WL1 in the cell strings CS11 to CS1*m* on the first row constitute one page. Memory cells coupled to the first word line WL1 in the cell strings CS21 to CS2*m* on the second row constitute another page. As any one of the drain select lines DSL1 and DSL2 is selected, cell strings arranged in one row direction may be selected. As any one of the word lines WL1 to WLn is selected, one page may be selected in the selected cell strings.

In another embodiment, even bit lines and odd bit lines may be provided instead of the first to m-th bit lines BL1 to BLm. In addition, even-numbered cell strings among the cell strings CS11 to CS1*m* or CS21 to CS2*m* arranged in the row direction may be coupled to the even bit lines, respectively, and odd-numbered cell strings among the cell strings CS11 to CS1*m* or CS21 to CS2*m* arranged in the row direction may be coupled to the odd bit lines, respectively.

In an embodiment, at least one of the first to n-th memory cells MC1 to MCn may be used as a dummy memory cell. For example, the at least one dummy memory cell may be provided to decrease an electric field between the source select transistor SST and the memory cells MC1 to MCp. Alternatively, the at least one dummy memory cell may be provided to decrease an electric field between the drain select transistor DST and the memory cells MCp+1 to MCn. When the number of dummy memory cells increases, the reliability of an operation of the memory block BLKa is improved, however, the size of the memory block BLKa increases. When the number of dummy memory cells decreases, the size of the memory block BLKa decreases, but the reliability of an operation of the memory block BLKa may be deteriorated.

In order to efficiently control the at least one dummy memory cell, the dummy memory cells may have a required threshold voltage. Before or after an erase operation of the memory block BLKa, a program operation may be performed on all or some of the dummy memory cells. When an erase operation is performed after the program operation is performed, the threshold voltage of the dummy memory cells controls a voltage applied to the dummy word lines coupled to the respective dummy memory cells, so that the dummy memory cells can have the required threshold voltage.

Figure 16:
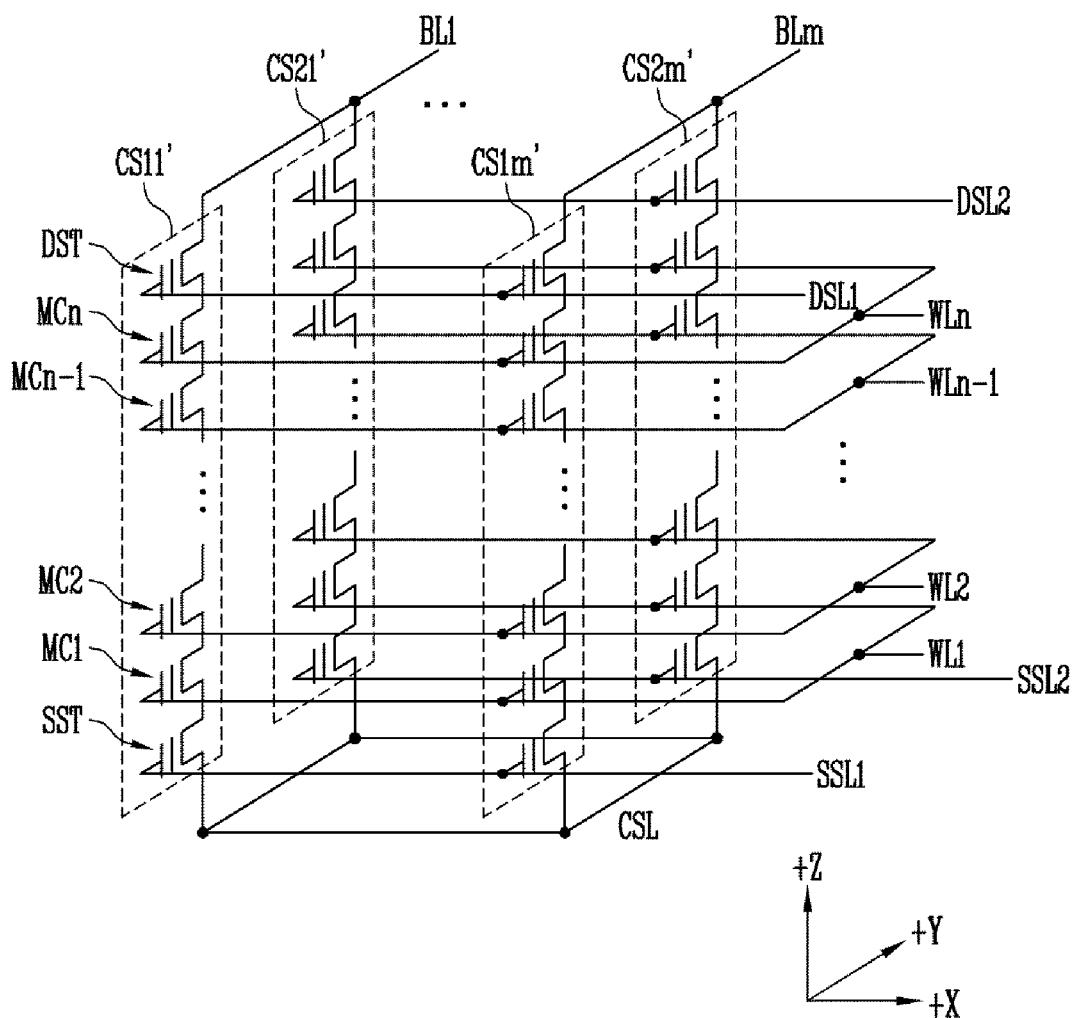
FIG. 16 is a circuit diagram illustrating a memory block among a plurality of memory blocks.

FIG. 16 is a circuit diagram illustrating a memory block BLKb among the memory blocks BLK1 to BLKz shown in FIG. 14.

Referring to FIG. 16, the memory block BLKb may include a plurality of cell strings CS11' to CS1*m*' and CS21' to CS2*m*'. Each of the plurality of cell strings CS11' to CS1*m*' and CS21' to CS2*m*' extends along the +Z direction. Each of the plurality of cell strings CS11' to CS1*m*' and CS21' to CS2*m*' includes at least one source select transistor SST, first to n-th memory cells MC1 to MCn, and at least one drain select transistor DST, which are stacked on a substrate (not shown) under the memory block BLKb.

The source select transistor SST of each cell string is coupled between a common source line CSL and the memory cells MC1 to MCn. The source select transistors of cell strings arranged on the same row are coupled to the same source select line. The source select transistors of the cell strings CS11' to CS1*m*' arranged on a first row are coupled to a first source select line SSL1. Source select transistors of the cell strings CS21' to CS2*m*' arranged on a second row are coupled to a second source select line SSL2. In another embodiment, the source select transistors of the cell strings CS11' to CS1*m*' and CS21' to CS2*m*' may be commonly coupled to one source select line.

The first to n-th memory cells MC1 to MCn of each cell string are coupled in series between the source select transistor SST and the drain select transistor DST. Gate electrodes of the first to n-th memory cells MC1 to MCn are coupled to first to n-th word lines WL1 to WLn, respectively.

The drain select transistor DST of each cell string is coupled between a corresponding bit line and the memory cells MC1 to MCn. The drain select transistors of cell strings arranged in the row direction are coupled to a drain select line extending in the row direction. The drain select transistors of the cell strings CS11' to CS1*m*' on the first row are coupled to a first drain select line DSL1. The drain select transistors of the cell strings CS21' to CS2*m*' on the second row are coupled to a second drain select line DSL2.

Consequently, the memory block BLKb of FIG. 16 has a circuit similar to that of the memory block BLKa of FIG. 15, except that the pipe transistor PT is excluded from each cell string in FIG. 16.

In another embodiment, even bit lines and odd bit lines may be provided instead of the first to m-th bit lines BL1 to BLm. In addition, even-numbered cell strings among the cell strings CS11' to CS1m' or CS21' to CS2m' arranged in the row direction may be coupled to the even bit lines, respectively, and odd-numbered cell strings among the cell strings CS11' to CS1m' or CS21' to CS2m' arranged in the row direction may be coupled to the odd bit lines, respectively.

In an embodiment, at least one of the first to n-th memory cells MC1 to MCn may be used as a dummy memory cell. For example, the at least one dummy memory cell may be provided to decrease an electric field between the source select transistor SST and the memory cells MC1 to MCn. Alternatively, the at least one dummy memory cell may be provided to decrease an electric field between the drain select transistor DST and the memory cells MC1 to MCn. When the number of dummy memory cells increases, the reliability of an operation of the memory block BLKb is improved, but the size of the memory block BLKb may be increased. When the number of dummy memory cells decreases, the size of the memory block BLKb decreases, but the reliability of an operation of the memory block BLKb may be deteriorated.

In order to efficiently control the at least one dummy memory cell, the dummy memory cells may have a required threshold voltage. Before or after an erase operation of the memory block BLKb, a program operation may be performed on all or some of the dummy memory cells. When an erase operation is performed after the program operation is performed, the threshold voltage of the dummy memory cells controls a voltage applied to the dummy word lines coupled to the respective dummy memory cells, so that the dummy memory cells can have the required threshold voltage.

Figure 17:
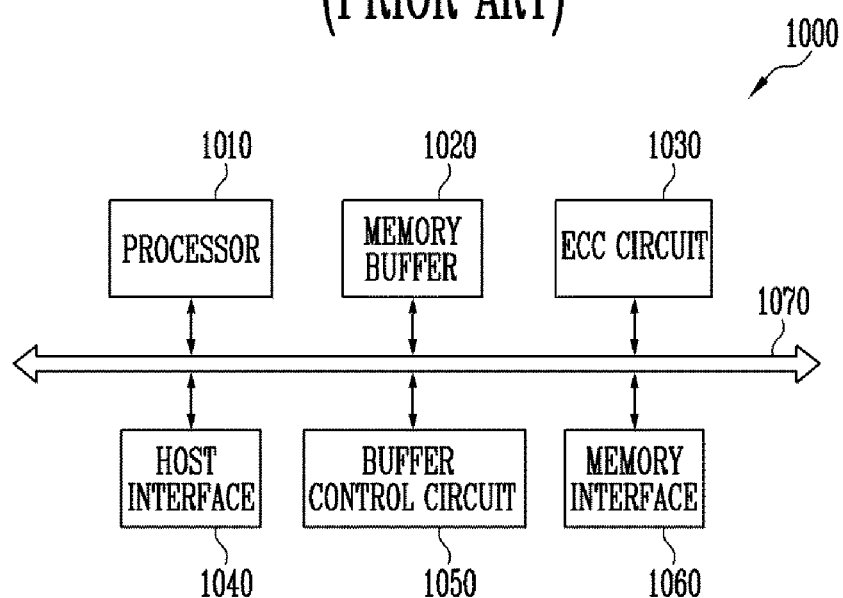
FIG. 17 is a diagram illustrating a memory controller in accordance with an embodiment of the present disclosure.

FIG. 17 is a diagram illustrating a memory controller in accordance with an embodiment of the present disclosure, for example, the memory controller 200 shown in FIG. 1.

The memory controller 1000 is coupled to a host and a memory device. The memory controller 1000 is configured to access the memory device in response to a request received from the host. For example, the memory controller 1000 is configured to control read, program, erase, and background operations of the memory device. The memory controller 1000 is configured to provide an interface between the memory device and the host. The memory controller 1000 is configured to drive firmware for controlling the memory device.

Referring to FIG. 17, the memory controller 1000 may include a processor 1010, a memory buffer 1020, an error correction code (ECC) circuit 1030, a host interface 1040, a buffer control circuit 1050, a memory interface 1060, and a bus 1070.

The bus 1070 may be configured to provide channels between components of the memory controller 1000.

The processor 1010 may control overall operations of the memory controller 1000, and perform a logical operation. The processor 1010 may communicate with the external host through the host interface 1040, and communicate with the memory device through the memory interface 1060. Also, the processor 1010 may communicate with the memory buffer 1020 through the buffer control circuit 1050. The processor 1010 may control an operation of the storage device, using the memory buffer 1020 as a working memory, a cache memory or a buffer memory.

The processor 1010 may perform a function of a flash translation layer (FTL). The processor 1010 may translate a logical block address (LBA) provided by the host through the FTL into a physical block address (PBA). The FTL may receive an LBA, using mapping information, to be translated into a PBA. Several address mapping methods of the FTL exist according to mapping units. A representative address mapping method includes a page mapping method, a block mapping method, and a hybrid mapping method.

The processor 1010 is configured to randomize data received from the host. For example, the processor 1010 may randomize data received from the host, using a randomizing seed. The randomized data is provided as data to be stored to the memory device to be programmed in the memory cell array.

In a read operation, the processor 1010 is configured to derandomize data received from the memory device. For example, the processor 1010 may derandomize data received from the memory device, using a derandomizing seed. The derandomized data may be output to the host.

In an embodiment, the processor 1010 may perform randomizing and derandomizing by driving software or firmware.

The memory buffer 1020 may be used as the working memory, the cache memory, or the buffer memory of the processor 1010. The memory buffer 1020 may store codes and commands, which are executed by the processor 1010. The memory buffer 1020 may include a Static RAM (SRAM) or a Dynamic RAM (DRAM).

The ECC circuit 1030 may perform an ECC operation. The ECC circuit 1030 may perform ECC encoding on data to be written in the memory device through the memory interface 1060. The ECC encoded data may be transferred to the memory device through the memory interface 1060. The ECC circuit 1030 may perform ECC decoding on data received from the memory device through the memory interface 1060. In an example, the ECC circuit 1030 may be included as a component of the memory interface 1060 in the memory interface 1060.

The host interface 1040 may communicate with the external host under the control of the processor 1010. The host interface 1040 may communicate with the host, using at least one of various communication manners, such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a nonvolatile memory express (NVMe), a universal flash storage (UFS), a Secure Digital (SD), a Multi-Media Card (MMC), an embedded MMC (eMMC), a Dual In-line Memory Module (DIMM), a Registered DIMM (RDIMM), and a Load Reduced DIMM (LRDIMM).

The buffer control circuit 1050 is configured to control the memory buffer 1020 under the control of the processor 1010.

The memory interface 1060 is configured to communicate with the memory device under the control of the processor 1010. The memory interface 1060 may communicate a command, an address, and data with the memory device through a channel.

In an example, the memory controller 1000 may not include the memory buffer 1020 and the buffer control circuit 1050.

In an example, the processor 1010 may control an operation of the memory controller 1000 by using codes. The processor 1010 may load codes from a nonvolatile memory device (e.g., a read only memory (ROM)) provided in the memory controller 1000. In another example, the processor 1010 may load codes from the memory device through the memory interface 1060.

In an example, the bus 1070 of the memory controller 1000 may be divided into a control bus and a data bus. The data bus may be configured to transmit data in the memory controller 1000, and the control bus may be configured to transmit control information such as a command and an address in the memory controller 1000. The data bus and the control bus are separated from each other, and may not interfere or influence with each other. The data bus may be coupled to the ECC circuit 1030, the host interface 1040, the buffer control circuit 1050, and the memory interface 1060. The control bus may be coupled to the host interface 1040, the processor 1010, the buffer control circuit 1050, the memory buffer 1020, and the memory interface 1060.

Figure 18:
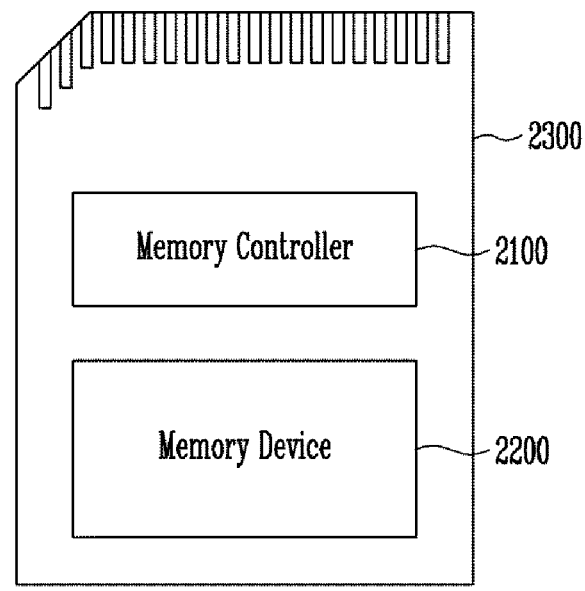
FIG. 18 is a block diagram illustrating a memory card system including a storage device in accordance with an embodiment of the present disclosure.

FIG. 18 is a block diagram illustrating a memory card system 2000 to which the storage device is applied in accordance with an embodiment of the present disclosure.

Referring to FIG. 18, the memory card system 2000 includes a memory controller 2100, a memory device, and a connector 2300.

The memory controller 2100 is coupled to the memory device 2200. The memory controller 2100 is configured to access the memory device 2200. For example, the memory controller 2100 is configured to control read, write, erase, and background operations of the memory device 2200. The memory controller 2100 is configured to provide an interface between the memory device 2200 and a host. The memory controller 2100 is configured to drive firmware for controlling the memory device 2200. The memory device 2200 may be implemented identically to the memory device 100 described with reference to FIG. 6.

In an example, the memory controller 2100 may include components such as a Random Access Memory (RAM), a processing unit, a host interface, a memory interface, and an ECC circuit.

The memory controller 2100 may communicate with an external device through the connector 2300. The memory controller 2100 may communicate with the external device (e.g., the host) according to a specific communication protocol. In an example, the memory controller 2100 may communicate with the external device through at least one of various communication protocols such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), firewire, a Universal Flash Storage (UFS), Wi-Fi, Bluetooth, and NVMe.

In an example, the memory device 2200 may be implemented with various nonvolatile memory devices such as an Electrically Erasable and Programmable ROM (EEPROM), a NAND flash memory, a NOR flash memory, a Phase-change RAM (PRAM), a Resistive RAM (ReRAM), a Ferroelectric RAM (FRAM), and a Spin Torque Transfer magnetic RAM (STT-MRAM).

The memory controller 2100 and the memory device 2200 may be integrated into a single semiconductor device, to constitute a memory card. For example, the memory controller 2100 and the memory device 2200 may constitute a memory card such as a PC card (e.g., Personal Computer Memory Card International Association (PCMCIA) card), a Compact Flash (CF) card, a Smart Media Card (e.g., SM and SMC), a memory stick, a Multi-Media Card (e.g., MMC, RS-MMC, MMCmicro and eMMC), a secure digital (SD) card (e.g., SD, miniSD, microSD and SDHC), and a Universal Flash Storage (UFS).

Figure 19:
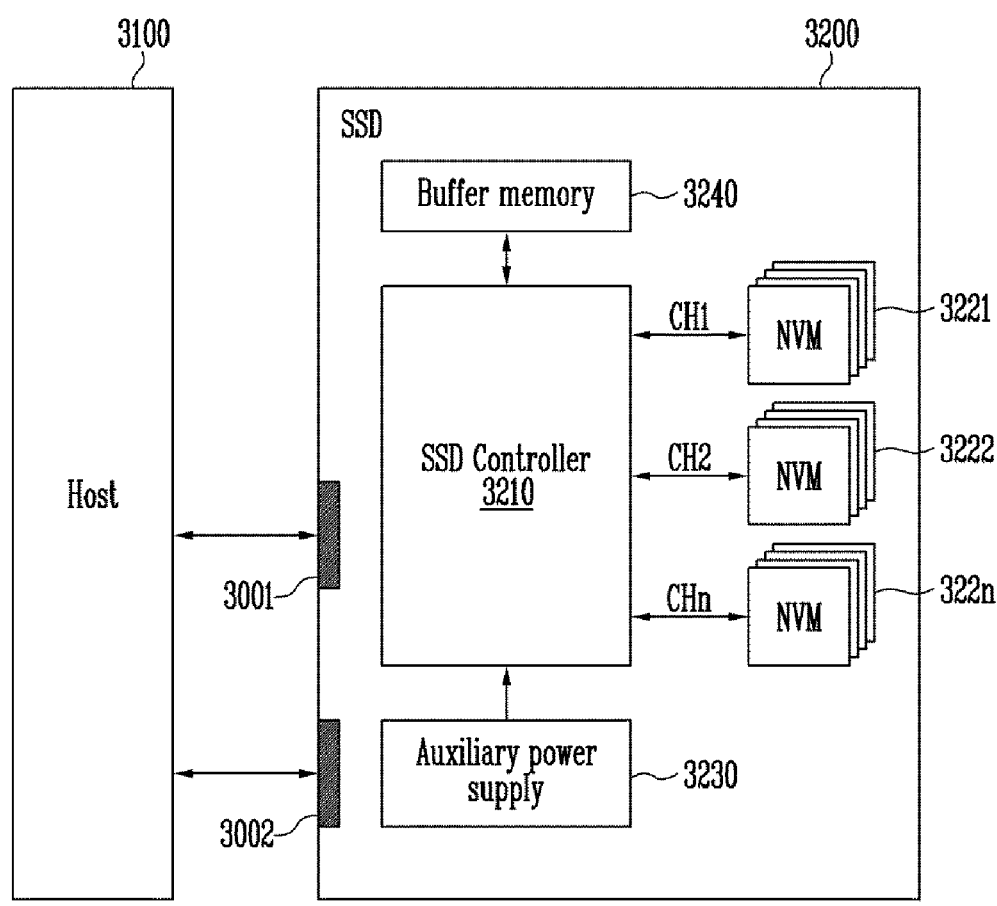
FIG. 19 is a block diagram illustrating a solid state drive (SSD) system including a storage device in accordance with an embodiment of the present disclosure.

FIG. 19 is a block diagram illustrating a solid state drive (SSD) system 3000 to which the storage device is applied in accordance with an embodiment of the present disclosure.

Referring to FIG. 19, the SSD system 3000 includes a host 3100 and an SSD 3200. The SSD 3200 exchanges a signal SIG with the host 3100 through a signal connector 3001, and receives power PWR through a power connector 3002. The SSD 3200 includes an SSD controller 3210, a plurality of flash memories 3221 to 322n, an auxiliary power supply 3230, and a buffer memory 3240.

In an embodiment, the SSD controller 3210 may serve as the memory controller 200 described with reference to FIG. 1.

The SSD controller 3210 may control the plurality of flash memories 3221 to 322n in response to a signal SIG received from the host 3100. In an example, the signal SIG may be a signal based on an interface between the host 3100 and the SSD 3200. For example, the signal SIG may be a signal defined by at least one of interfaces such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), a firewire, a Universal Flash Storage (UFS), a wireless fidelity (Wi-Fi), a Bluetooth, and an NVMe.

The auxiliary power supply 3230 is coupled to the host 3100 through the power connector 3002. When the supply of power from the host 3100 is not smooth, the auxiliary power supply 3230 may provide power of the SSD 3200. In an example, the auxiliary power supply 3230 may be located in the SSD 3200, or be located at the outside of the SSD 3200. For example, the auxiliary power supply 3230 may be located on a main board, and provide auxiliary power to the SSD 3200.

The buffer memory 3240 operates as a buffer memory of the SSD 3200. For example, the buffer memory 3240 may temporarily store data received from the host 3100 or data received from the plurality of flash memories 3221 to 322n, or temporarily store meta data (e.g., mapping information) of the flash memories 3221 to 322n. The buffer memory 3240 may include volatile memories such as a DRAM, an SDRAM, a DDR SDRAM, an LPDDR SDRAM, and a GRAM or nonvolatile memories such as a FRAM, a ReRAM, an STT-MRAM, and a PRAM.

Figure 20:
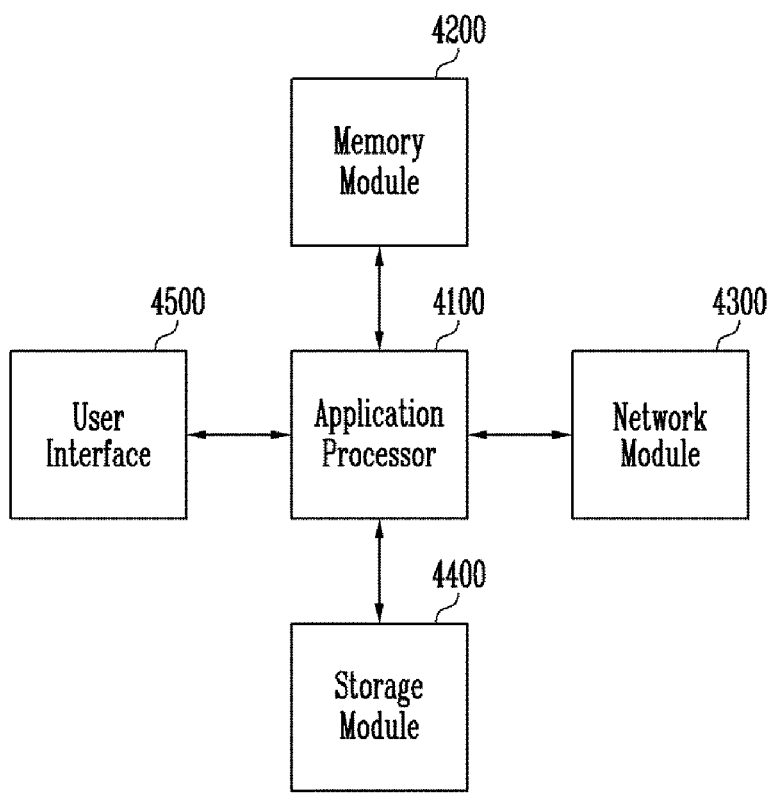
FIG. 20 is a block diagram illustrating a user system having a storage device in accordance with an embodiment of the present disclosure.

FIG. 20 is a block diagram illustrating a user system 4000 to which the storage device is applied in accordance with an embodiment of the present disclosure.

Referring to FIG. 20, the user system 4000 includes an application processor 4100, a memory module 4200, a network module 4300, a storage module 4400, and a user interface 4500.

The application processor 4100 may drive components included in the user system 4000, an operating system (OS), a user program, or the like. In an example, the application processor 4100 may include controllers for controlling components included in the user system 4000, interfaces, a graphic engine, and the like. The application processor 4100 may be provided as a System-on-Chip (SoC).

The memory module 4200 may operate as a main memory, working memory, buffer memory or cache memory of the user system 4000. The memory module 4200 may include volatile random access memories such as a DRAM, an SDRAM, a DDR SDRAM, a DDR2 SDRM, a DDR3 SDRAM, an LPDDR SDRAM, an LPDDR2 SDRAM, and an LPDDR3 SDRAM or volatile random access memories such as a PRAM, a ReRAM, an MRAM, and a FRAM. In an example, the application processor 4100 and the memory module 4200 may be provided as one semiconductor package by being packaged based on a Package on Package (PoP).

The network module 4300 may communicate with external devices. In an example, the network module 4300 may support wireless communications such as Code Division Multiple Access (CDMA), Global System for Mobile communication (GSM), Wideband CDMA (WCDMA), CDMA-2000, Time Division Multiple Access (TDMA), Long Term Evolution (LTE), Wimax, WLAN, UWB, Bluetooth, and Wi-Fi. In an example, the network module 4300 may be included in the application processor 4100.

The storage module 4400 may store data. For example, the storage module 4400 may store data received from the application processor 4100. Alternatively, the storage module 4400 may transmit data stored therein to the application processor 4100. In an example, the storage module 4400 may be implemented with a nonvolatile semiconductor memory device such as a Phase-change RAM (PRAM), a Magnetic RAM (MRAM), a Resistive RAM (RRAM), a NAND flash, a NOR flash, or a NAND flash having a three-dimensional structure. In an example, the storage module 4400 may be provided as a removable drive such as a memory card of the user system 4000 or an external drive.

In an example, the storage module 4400 may include a plurality of nonvolatile memory devices, and the plurality of nonvolatile memory devices may operate identically to the memory device described with reference to FIG. 13. The storage module 4400 may operate identically to the storage device 50 described with reference to FIG. 1.

The user interface 4500 may include interfaces for inputting data or commands to the application processor 4100 or outputting data to an external device. In an example, the user interface 4500 may include user input interfaces such as a keyboard, a keypad, a button, a touch panel, a touch screen, a touch pad, a touch ball, a camera, a microphone, a gyroscope sensor, a vibration sensor and a piezoelectric element. The user interface 4500 may include user output interfaces such as a Liquid Crystal Display (LCD), an Organic Light Emitting Diode (OLED) display device, an Active Matrix OLED (AMOLED) display device, an LED, a speaker, and a monitor.

In accordance with the present disclosure, there may be provided a storage device for normal parameter setting and an operating method thereof.

While the present disclosure has been shown and described with reference to certain exemplary embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described exemplary embodiments but should be determined by not only the appended claims but also the equivalents thereof.

In the above-described embodiments, all steps may be selectively performed or some of the steps may be omitted. In each embodiment, the steps are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

The exemplary embodiments of the present disclosure have been described in the drawings and specification. Although specific terminologies are used here, the terminologies are only to describe the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein.

What is claimed is:

1. A memory device for storing data, the memory device comprising:
   a parameter setting circuit configured to receive parameter data including a parameter value from a memory controller, and to set the parameter value related to an operation of the memory device; and
   a register configured to store the parameter value,
   wherein the parameter data includes an error protection field, and
   wherein, when the error protection field includes a setting value return field, the parameter setting circuit performs storing or changing the parameter value, returning the parameter value stored in the register to the memory controller, and re-storing the parameter value in the register in response to a command indicating that the parameter value stored in the register is different from the parameter data provided by the memory controller.

2. The memory device of claim 1, wherein, when the error protection field includes the setting value return field, the parameter setting circuit stores the parameter value in the register and requests the parameter value stored in the register, based on a value of the setting value return field.

3. The memory device of claim 2, wherein the parameter setting circuit outputs the parameter value in the register.

4. The memory device of claim 1, wherein, when the error protection field includes the parameter change group field, the parameter setting circuit stores the parameter value in the register when a value of the parameter change group field corresponds to a value of a field requiring a change of the parameter value.

5. The memory device of claim 4, wherein the parameter setting circuit discards a set parameter command, when the value of the parameter change group field does not correspond to the value of the field requiring the change of the parameter value.

6. The memory device of claim 5, wherein, when the error protection field includes the change data display field, the parameter setting circuit changes data at a position masked in a parameter value to be changed, based on a value of the change data display field.

7. A storage device comprising:
   a memory device including a register; and
   a controller configured to generate parameter data including a parameter value and an error protection field and output the parameter data to the memory device,
   wherein the memory device receives the parameter data, stores the parameter value in the register to perform an operation based on the parameter value and transmits, to the controller, the parameter value stored in the register in response to a setting value return field included in the error protection field, and
   wherein the controller compares the parameter data outputted to the memory device with the parameter value stored in the register, and re-outputs the parameter data to the memory device when the parameter value stored in the register is different from the parameter data outputted to the memory device.

8. A method for operating a memory controller for controlling a memory device including a register, the method comprising:
generating parameter data for storing or changing a parameter value related to an operation of the memory device;
outputting the parameter data to the memory device,
wherein the parameter data includes an error protection field,
requesting, when the error protection field includes a setting value return field, a return of the parameter value stored in the register after the memory device stores the parameter data in the register;
comparing the parameter data outputted to the memory device with the parameter value stored in the register; and
re-outputting the parameter data to the memory device when the parameter value stored in the register is different from the parameter data outputted to the memory device.

9. The method of claim 8, wherein the generating parameter data includes generating the parameter data, including at least one of the setting value return field determining whether to output a changed parameter value, a parameter change group field determining whether to change the parameter value according to whether the operation related to the parameter value and the operation to be performed by the memory device coincide with each other, and a change data display field determining the parameter value position to be changed.

10. The method of claim 9, further comprising, when the error protection field includes the setting value return field, receiving, from the memory device, the parameter value stored in the register, based on a value of the setting value return field.

11. The method of claim 10, further comprising, when a setting value in the parameter data is different from the parameter value stored in the register, outputting, to the memory device, a set parameter command for re-storing the setting value of the parameter data in the memory device.

12. The method of claim 9, wherein the parameter change group field is a field for sorting the operation.

13. The method of claim 9, wherein, when the error protection field includes the change data display field, the parameter data includes data for masking a position of a value to be changed in the parameter value stored in the memory device.

14. A memory controller for controlling a memory device including a register, the memory controller comprising:
a parameter data generator configured to generate parameter data for changing a parameter value related to an operation of the memory device; and
a parameter controller configured to output the parameter data to the memory device,
wherein the parameter data includes an error protection field,
wherein the error protection field includes a setting value return field for requesting a return of the parameter value stored in the register after the memory device stores the parameter data in the register, and
wherein the parameter controller compares the parameter data outputted to the memory device with the parameter value stored in the register, and re-outputs the parameter data to the memory device when the parameter value stored in the register is different from the parameter data outputted to the memory device.

15. The memory controller of claim 14, wherein the error protection field includes at least one of the setting value return field determining whether to output a changed parameter value, a parameter change group field determining whether to change the parameter value according to whether the operation related to the parameter value and the operation to be performed by the memory device coincide with each other, and a change data display field determining the parameter value position to be changed.

16. The memory controller of claim 15, wherein, when the error protection field includes the setting value return field, the parameter controller receives, from the memory device, the parameter value stored in the register, based on a value of the setting value return field.

17. The memory controller of claim 16, wherein, when a setting value in the parameter data is different from the parameter value stored in the register, the parameter controller outputs, to the memory device, a set parameter command for re-storing the setting value of the parameter data in the register.

18. The memory controller of claim 15, wherein the parameter change group field is a field for sorting the operation.

19. The memory controller of claim 18, wherein the operation includes one of a program operation, a read operation, and an erase operation.

20. The memory controller of claim 15, wherein, when the error protection field includes the change data display field, the parameter data includes data for masking a position of a value to be changed in the parameter value stored in the memory device.

* * * * *

UNITED STATES PATENT AND TRADEMARK OFFICE
CERTIFICATE OF CORRECTION

Page 1 of 1

PATENT NO. : 11,372,563 B2
APPLICATION NO. : 16/549437
DATED : June 28, 2022
INVENTOR(S) : Lee et al.

It is certified that error appears in the above-identified patent and that said Letters Patent is hereby corrected as shown below:

On the Title Page

Item (54) and in the Specification Column 1, Lines 1-2, Title of Invention should read:
-- STORAGE DEVICE AND OPERATING METHOD THEREOF FOR NORMAL PARAMETER SETTING IN MEMORY DEVICE --

Signed and Sealed this
Sixth Day of September, 2022

Katherine Kelly Vidal
*Director of the United States Patent and Trademark Office*